(12) United States Patent
Tsumagari et al.

(10) Patent No.: US 9,204,477 B2
(45) Date of Patent: Dec. 1, 2015

(54) MEMORY DEVICE AND WIRELESS COMMUNICATION CONTROL METHOD OF THE SAME

(71) Applicant: KABUSHIKI KAISHA TOSHIBA, Tokyo (JP)

(72) Inventors: Yasufumi Tsumagari, Kawasaki (JP); Kuniaki Ito, Funabashi (JP); Takashi Wakutsu, Kamakura (JP); Shuichi Sakurai, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 294 days.

(21) Appl. No.: 13/847,160

(22) Filed: Mar. 19, 2013

(65) Prior Publication Data

US 2013/0272284 A1     Oct. 17, 2013

(30) Foreign Application Priority Data

Apr. 13, 2012  (JP) ................. 2012-091775

(51) Int. Cl.

| | |
|---|---|
| *G06K 19/07* | (2006.01) |
| *G06K 17/00* | (2006.01) |
| *H04W 76/02* | (2009.01) |
| *G06K 19/077* | (2006.01) |
| *G08C 17/00* | (2006.01) |
| *H04W 88/06* | (2009.01) |

(52) U.S. Cl.
CPC ......... *H04W 76/023* (2013.01); *G06K 19/0723* (2013.01); *G06K 19/07749* (2013.01); *G08C 17/00* (2013.01); *H04W 88/06* (2013.01)

(58) Field of Classification Search
None
See application file for complete search history.

(56) References Cited

U.S. PATENT DOCUMENTS

| 2002/0036896 A1* | 3/2002 | Matsumoto ................... 361/752 |
|---|---|---|
| 2002/0174337 A1 | 11/2002 | Aihara |
| 2004/0230345 A1* | 11/2004 | Tzamaloukas ................... 701/1 |

(Continued)

FOREIGN PATENT DOCUMENTS

| CN | 1347061 A | 5/2002 |
|---|---|---|
| CN | 1833239 A | 9/2006 |

(Continued)

OTHER PUBLICATIONS

Technical Committee SD Card Association, "SD Specifications Part E1 SDIO Simplified Specification", http://www.sdcard.org/home/, Version 3.00, Feb. 25, 2011, 90 pages.

(Continued)

*Primary Examiner* — Robert C Scheibel
(74) *Attorney, Agent, or Firm* — Oblon, McClelland, Maier & Neustadt, L.L.P.

(57) ABSTRACT

According to one embodiment, a memory device includes a nonvolatile semiconductor memory, a control unit and a wireless communication unit. The control unit controls the nonvolatile semiconductor memory. The wireless communication unit includes a wireless communication function and is controlled by the control unit. The control unit includes a first control mode to control the wireless communication unit in accordance with set information when a control command to control the wireless communication unit is not received within a predetermined time. The control unit includes a second control mode to control the wireless communication unit in accordance with the control command when the control command is received within the predetermined time.

20 Claims, 21 Drawing Sheets

(56) References Cited

U.S. PATENT DOCUMENTS

| | | |
|---|---|---|
| 2006/0026348 A1* | 2/2006 | Wallace et al. ............... 711/115 |
| 2007/0258377 A1 | 11/2007 | Jantunen et al. |
| 2009/0152361 A1* | 6/2009 | Narendra et al. ............ 235/492 |
| 2009/0239468 A1 | 9/2009 | He et al. |
| 2009/0258679 A1* | 10/2009 | Chen ............................. 455/557 |
| 2010/0033307 A1* | 2/2010 | Narendra et al. ............ 340/10.1 |
| 2010/0169548 A1 | 7/2010 | Kanda |
| 2011/0130169 A1* | 6/2011 | Arimura ....................... 455/558 |
| 2012/0209939 A1 | 8/2012 | Ito et al. |
| 2013/0039352 A1* | 2/2013 | Ruster et al. .................. 370/338 |
| 2013/0047212 A1* | 2/2013 | Fang et al. ....................... 726/3 |

FOREIGN PATENT DOCUMENTS

| | | |
|---|---|---|
| CN | 101023438 A | 8/2007 |
| CN | 102087719 A | 6/2011 |
| JP | 2002-91709 | 3/2002 |
| JP | 2002-329180 | 11/2002 |
| JP | 2006-236200 | 9/2006 |
| JP | 2007-122642 A | 5/2007 |
| JP | 2009-124302 | 6/2009 |
| JP | 2010-67060 | 3/2010 |
| JP | 2012-168865 | 9/2012 |
| WO | WO 2012/105083 A2 | 8/2012 |

OTHER PUBLICATIONS

SD Group Panasonic Corporation, SanDisk Corporation, Toshiba Corporation, Technical Committee SD Card Association, "SD Specifications Part 1 Physical Layer Simplified Specification", http://www.sdcard.org/home/, Version 3.01, May 18, 2010, 153 pages.

Office Action issued Jun. 9, 2015 in Japanese Patent Application No. 2012-091775 (with English language translation).

Yonekazu Tsuchida, "Eye-Fi" Possible Series Editorial Department Henshuubu, Eye-Fi Official Guide, Basic and Applied Skills 70 for More Fun Photographs, First Edition, Impress Japan Corporation, Feb. 21, 2012, 5 Pages.

Taiwanese Office Action issued Jan. 22, 2015 in Patent Application No. 102106584 (with English Translation).

Combined Office Action and Search Report issued May 12, 2015 in Chinese Patent Application No. 201310073977.1 (with English language translation).

Korean Office Action issued May 22, 2014, in Korea Patent Application No. 10-2013-0024449 (with English translation).

* cited by examiner

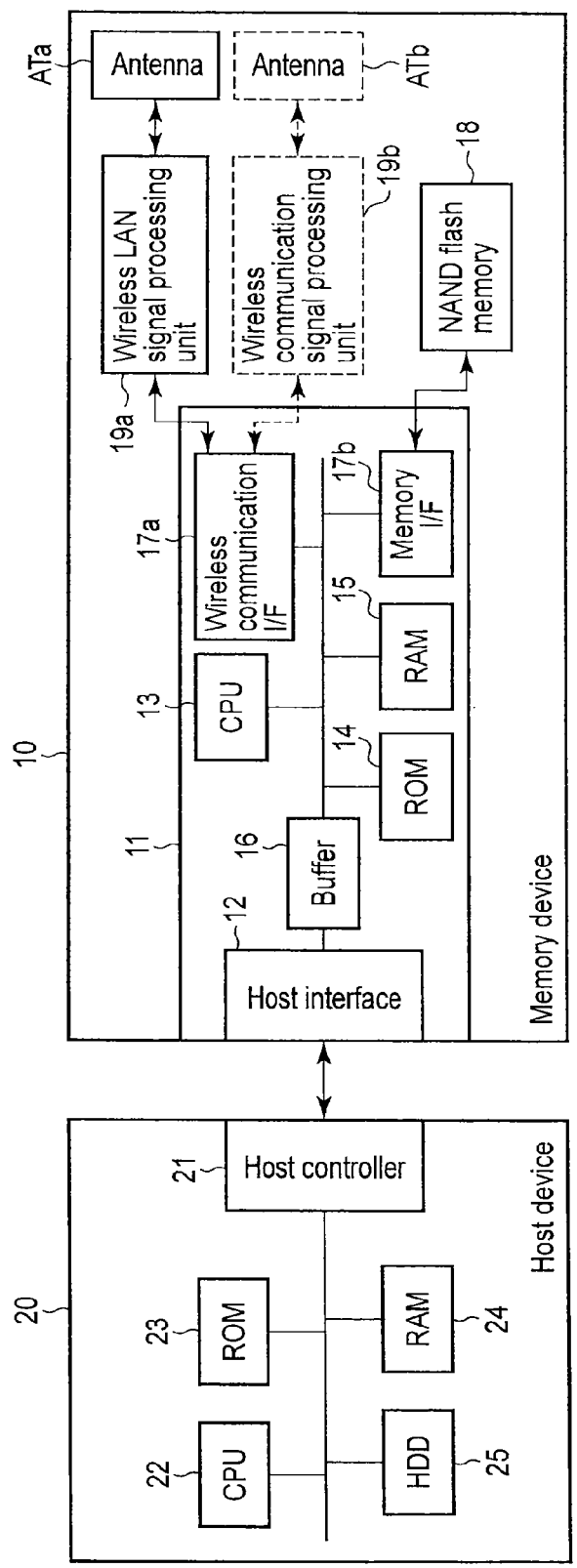
F I G. 1

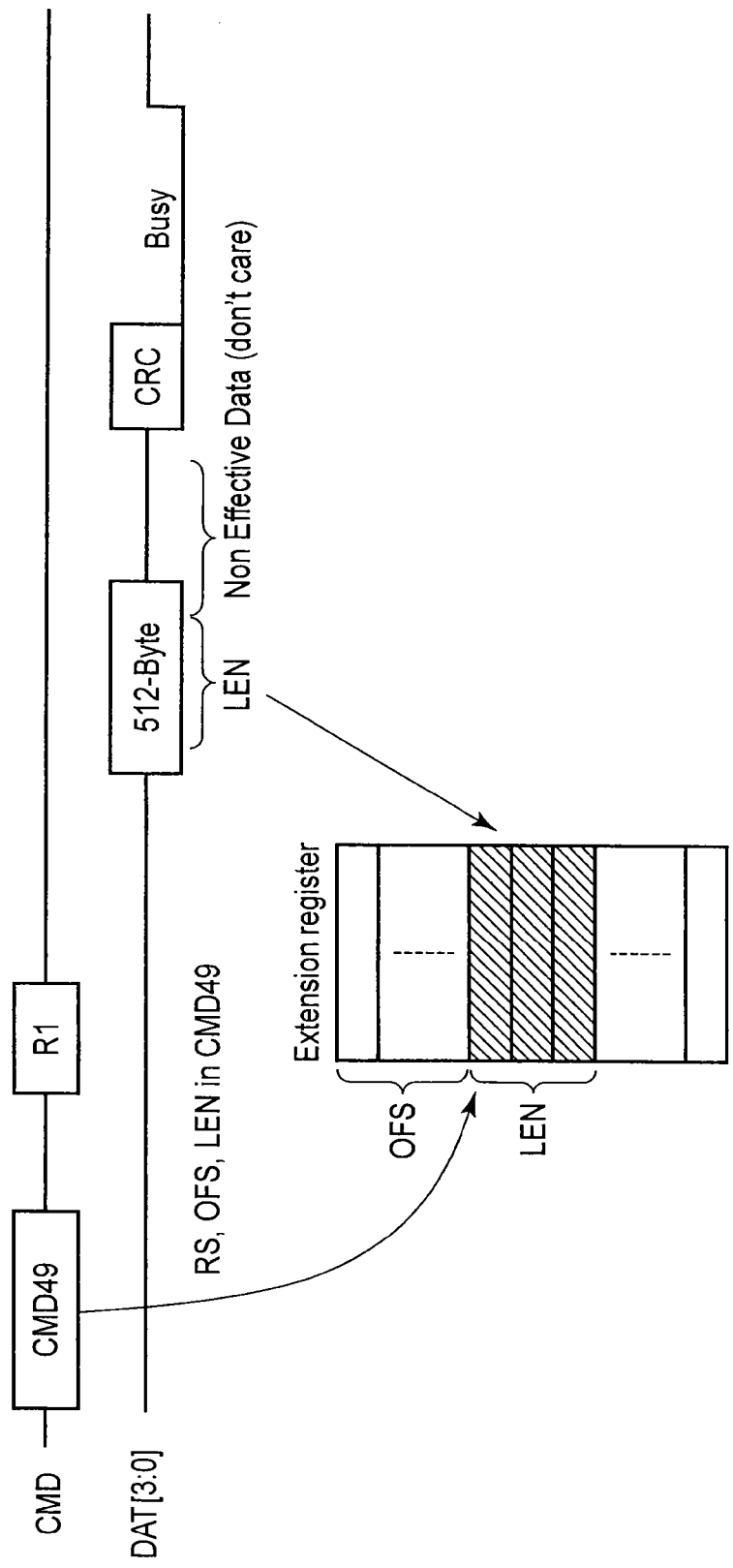
F I G. 7

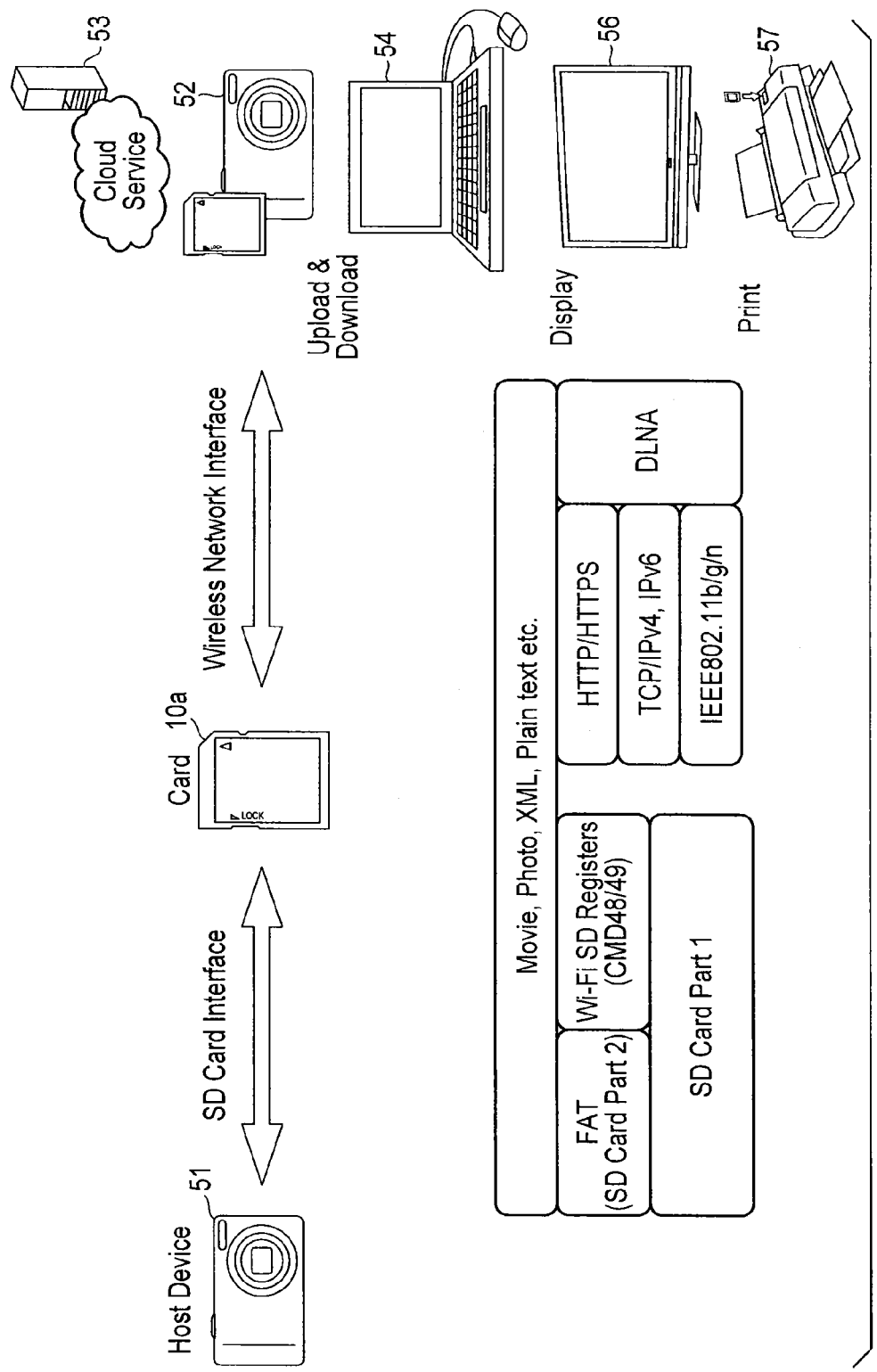
F I G. 10

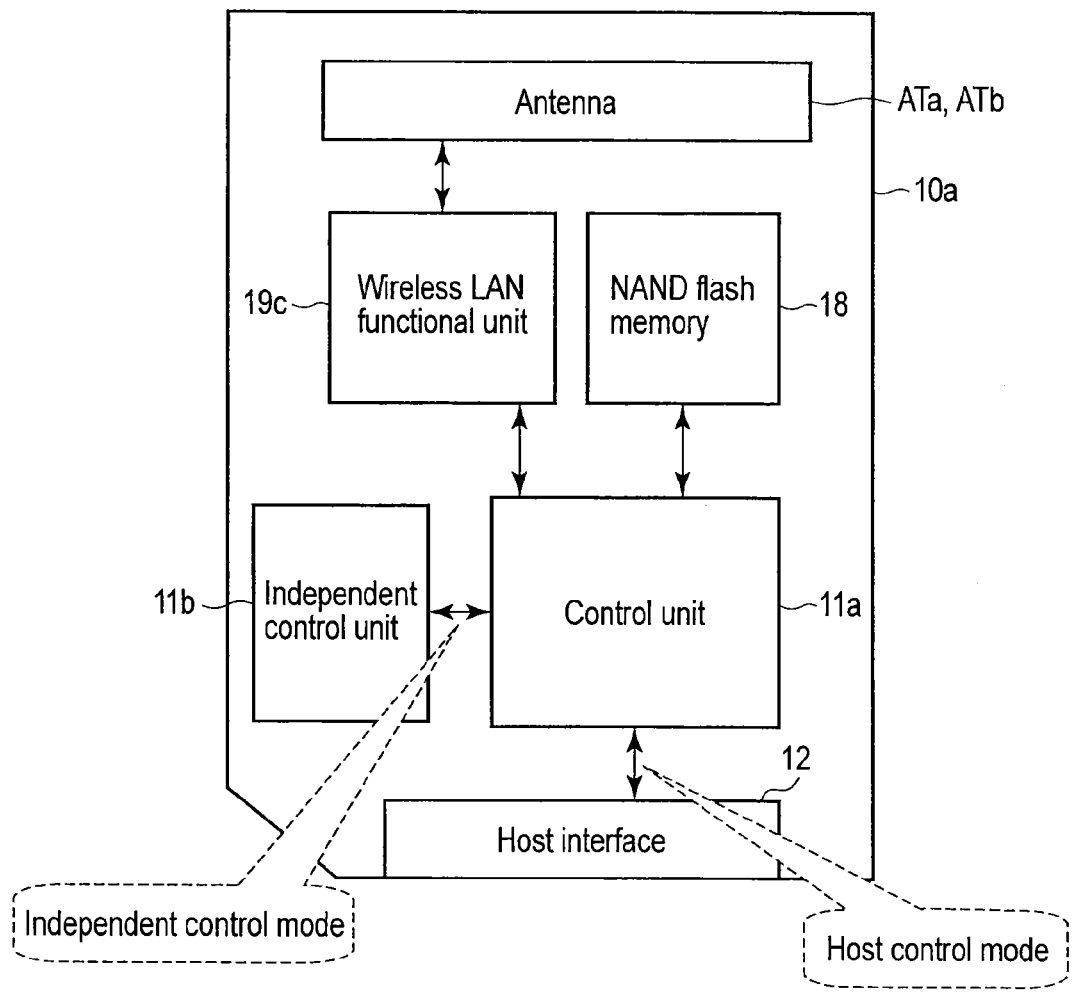
F I G. 11

| Size (byte) | Name | Short Description | RW |
|---|---|---|---|
| 8 | Wi-Fi SD Card Identifier | "WIFISD00" | R |
| 2 | Wi-Fi SD Card Specification Version | 0x0100 in this version | R |
| 16 | Wi-Fi SD Card Profile Indicator | Indicator to specify which functions are supported in a Card | R |
| 1 | Command Write Register Port | Data Port to write the Wi-Fi SD Card Command Write Register | W |
| 1 | Response Data Register Port | Data Port to read the Wi-Fi SD Card Response Data Register | R |
| 512 | Status Register | Memory Area to read the Wi-Fi SD Card Status Register | R |
| 512 | Command Response Status Register | Memory Area to read the Wi-Fi SD Card Command Response Status Register | R |

F I G. 12

| Size (byte) | Name | Short Description | RW |
|---|---|---|---|
| 8 | Wi-Fi SD Card Register Identifier | "WIFISDCR" | W |
| 2 | Size of Wi-Fi SD Card Register | Size of Wi-Fi SD Card Command Write Register | W |
| 1 | Number of Wi-Fi SD command Information | The number of Wi-Fi SD command Information to be processed | W |
| variable | Wi-Fi SD Command Information #1 | (below) | W |
| ... | ... | ... | W |
| variable | Wi-Fi SD Command Information #n1 | (below) | W |

| Size (byte) | Name | Short Description | RW |
|---|---|---|---|
| 2 | Wi-Fi SD command id | (next slide) | W |
| 4 | Wi-Fi SD command sequence id | Sequence ID to distinguish from other processed commands | W |
| 2 | Total Number of Arguments | Total number of Arguments for the command | W |
| 4 | Length of Argument #1 | Length of the argument for the command | W |
| L1 | Argument #1 | Argument for the command | W |
| ... | ... | ... | W |
| 4 | Length of Argument #n2 | ... | W |
| Ln | Argument #n2 | ... | W |

F I G. 13

| ID | Command Name | Short Description |
|---|---|---|
| 0x0001 | Scan() | Scan Wireless LAN and get the list of available SSIDs |
| 0x0002 | Connect (ssid, passphrase) | Connect to the specified Wireless LAN AP |
| 0x0003 | Establish (ssid, passphrase, authentication) | Establish Wireless LAN |
| 0x0004 | Disconnect() | Disconnect the connected or established Wireless LAN |
| 0x0005 | Read Response (sequenceID) | Read the Response Data of the specified Wi-Fi SD command |
| 0x0006 | Abort (sequenceID) | Abort the process of the specified Wi-Fi SD command |

FIG. 14

| Size (byte) | Name | Short Description | RW |
|---|---|---|---|
| 8 | Wi-Fi SD Card Register Identifier | "WIFISDSR" | R |
| 2 | Size of Wi-Fi SD Card Register | Size of Wi-Fi SD Card Status Register | R |
| 2 | SDIO Status | Current SDIO status | RW |
| 2 | SDIO Status Mask | Current SDIO status Mask | RW |
| 2 | Error status | Current Error Status | RW |
| 1 | WLAN | Current Wireless LAN status including "Connected", "AP-STA" and "Scan" status | R |
| 32 | SSID | Current SSID | R |
| 1 | Network Authentication | Current network authentication and data encryption for the SSID | R |
| 1 | HTTP Processing | Denote whether a Card processes an HTTP message or not | R |
| 1 | HTTP Progress | Progress for the download or the upload of HTTP messages | R |
| 2 | Date | Current Date in a Card | R |
| 2 | Time | Current Time in a Card | R |
| 1 | Media Change | Denote whether FAT in NAND Memory Module is updated | R |
| 1 | Response Data Update | Denote whether Response Data is updated | R |
| 4 | Response Data Size | Denote the size bytes of the Response Data | R |
| 1 | Signal Strength | Current signal strength | R |
| 6 | MAC Address | Mac Address of the Wi-Fi SD Card | R |
| 16 | ID | ID of this Card | R |

F I G. 15

| Size (byte) | Name | Short Description | RW |
|---|---|---|---|
| 8 | Wi-Fi SD Card Register Identifier | "WIFISDRS" | R |
| 2 | Size of Wi-Fi SD Card Register | Size of Wi-Fi SD Card Command Response Status Register | R |
| 1 | Number of Wi-Fi SD Command Response Status | Number of Command Response Status in the register | R |
| 16 | Wi-Fi SD Command Response Status #1 | (below) | R |
| ... | ... | ... | |
| 16 | Wi-Fi SD Command Response Status #n3 | (below) | R |

| Size (byte) | Name | Short Description | RW |
|---|---|---|---|
| 1 | Status Registration | Denote the command status registration | R |
| 2 | Wi-Fi SD command id | Command id corresponding to the one in Command Write Register | R |
| 4 | Wi-Fi SD command sequence id | Command sequence id corresponding to the one in Command Write Register | R |
| 1 | Command Response Status | Denote whether the specified command is accepted. 0x00: Initial (Default), 0x01: Command Processing, 0x02: Command Rejected, 0x03: Process Succeeded, 0x04: Process Terminated, 0x80-0xFF: Process Failed | |
| 4 | Reserved for Vendors for Error Status | This field is reserved for vendors for the error status | R |

F I G. 16

| Size (byte) | Name | Short Description | RW |
|---|---|---|---|
| 8 | Wi-Fi SD Card Identifier | "WIFISDRD" | R |
| 2 | Size of Wi-Fi SD Card Register | Size of Wi-Fi SD Card Response Data Register | R |
| 1 | Number of Wi-Fi SD Response Data | Number of Response Data in the register | R |
| 2 | Wi-Fi SD command id #1 | Command id corresponding to the one in Command Write Register | R |
| 4 | Wi-Fi SD command sequence id #1 | Command sequence id corresponding to the one in Command Write Register | R |
| 2 | Size of Response Data #1 | Size of Response Data | R |
| ... | ... | ... | R |
| 2 | Wi-Fi SD command id #n5 | | R |
| 4 | Wi-Fi SD command sequence id #n5 | | R |
| 2 | Size of Response Data #n5 | | R |
| L1 | Response Data #1 | This field stores Response Data by the command id 0x0205, 0x0206, 0x0207 and 0x0208 | R |
| ... | ... | ... | R |
| Ln | Response Data #n5 | ... | R |

F I G. 17

[WLANSD]
ID=SMITH'S_CARD
DHCP_Enabled=YES
IP_Address=
Subnet_Mask=
Default_Gateway=
Preferred_DNS_Server=
Alternate_DNS_Server=
Proxy_Server_Enabled=YES
Proxy_Server_Name=hogehoge.com
Port_Number=8080

[Vendor]
APPMODE=0 ; Independent control mode setting
APPNAME=WLANSD ; Name of NETBIOS
APPSSID_AP=MYSDCARD ; SSID of independent control mode AP
APPNETWORKKEY_AP=1234abcd ; Network key of independent control mode AP (encrypted)
APPAUTHETICATION=WPA2 and AES ; Authentication method of independent control mode AP
APPSSID_STA=MYHOME ; SSID of independent control mode STA
APPNETWORKKEY_STA=5678efgh ;Network key of independent control mode STA (encrypted)
APPMINTIME=5000 ; File sequential writing minimum time (msec) to start AP/STA in independent control mode
APPMAXTIME=10000 ; File sequential writing maximum time (msec) to start AP/STA in independent control mode
APPAUTOTIME=300000 ; Waiting time (msec) to end AP to which other devices are not connected in independent control mode
APPHOSTTIME=10000 ; Time (msec) to wait for access of host before startup of independent control mode

F I G. 19

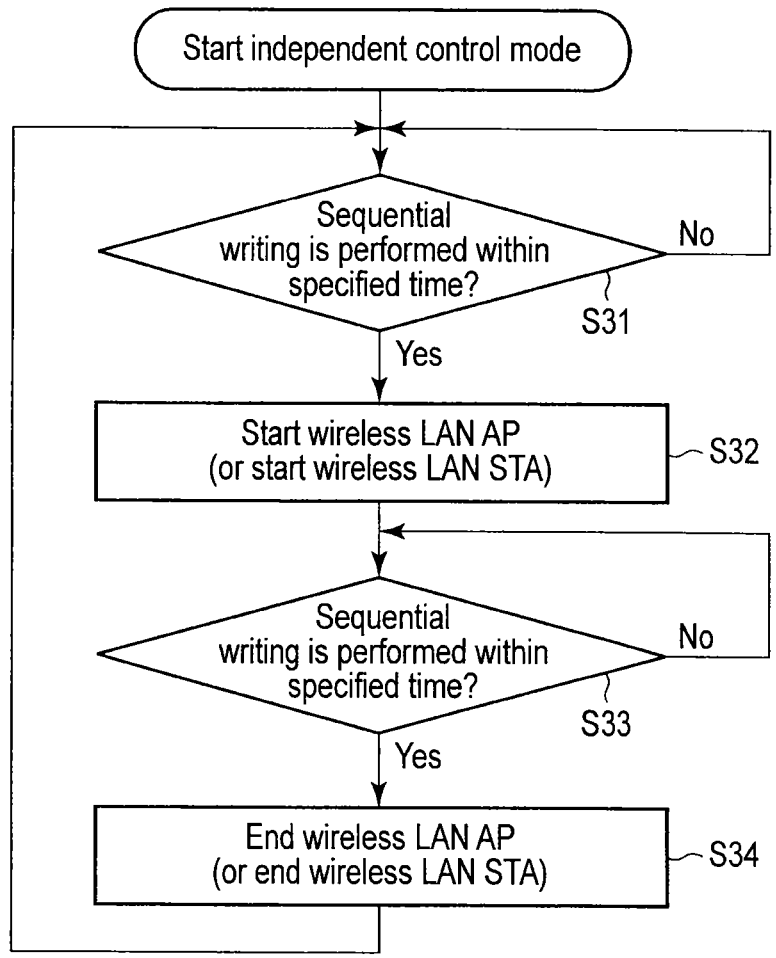
F I G. 23

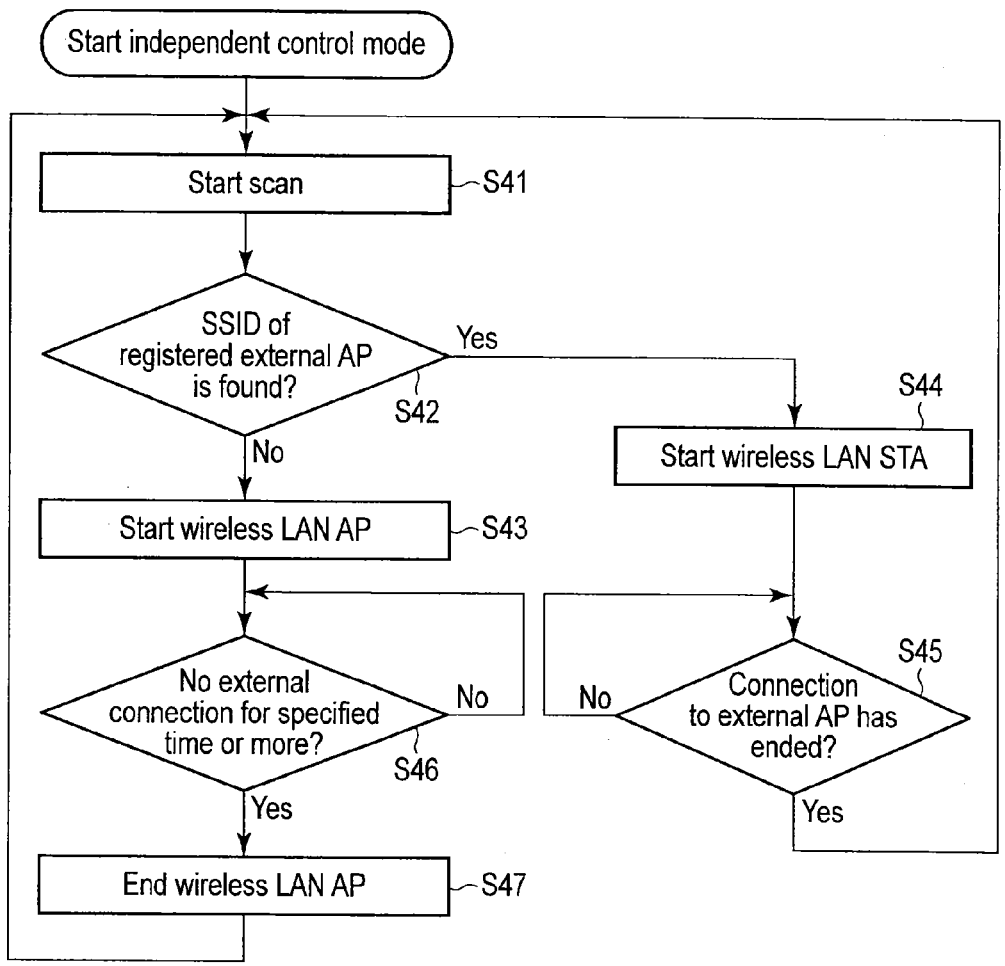
F I G. 24

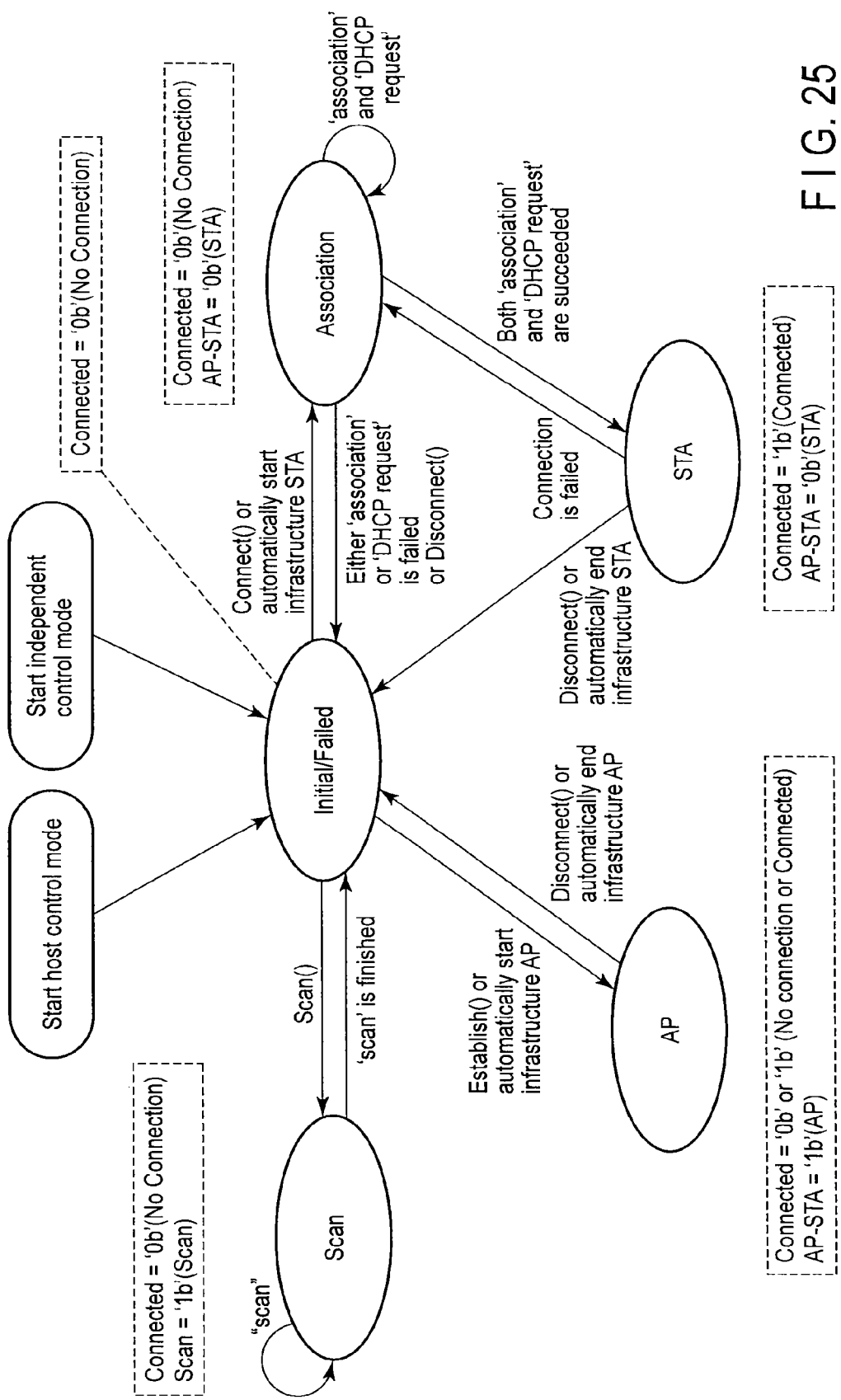
F I G. 25

MEMORY DEVICE AND WIRELESS COMMUNICATION CONTROL METHOD OF THE SAME

CROSS-REFERENCE TO RELATED APPLICATIONS

This application is based upon and claims the benefit of priority from Japanese Patent Application No. 2012-091775, filed Apr. 13, 2012, the entire contents of which are incorporated herein by reference.

FIELD

Embodiments described herein relate generally to a memory device having a wireless communication function and a wireless communication control method of the same.

BACKGROUND

Memory devices having a wireless LAN function such as secure digital (SD) cards have been developed, but these SD cards cannot be controlled by a host device. Meanwhile, an SD card having a wireless LAN function that is supposed to be controlled by a host device can be only operated by a dedicated host device.

BRIEF DESCRIPTION OF THE DRAWING

FIG. 1 is a block diagram showing the configuration of a memory system including a memory device according to an embodiment;

FIG. 7 is a timing chart showing the operation of writing into the extension register by the write command;

FIG. 10 is a diagram showing an interface function of the memory device;

FIG. 11 is a diagram showing a configuration example of the SD card according to the embodiment;

FIG. 12 is a table showing the extension register used in the SD card;

FIG. 13 is a table showing a configuration example of an SD card command write register;

FIG. 14 is a table showing a list of commands to be written into the SD card command write register;

FIG. 15 is a table showing a configuration example of an SD card status register;

FIG. 16 is a table showing a configuration example of an SD card command response status register;

FIG. 17 is a table showing a configuration example of an SD card response data register;

FIG. 19 is a diagram showing a configuration example of configuration information in the SD card;

FIGS. 21 to 24 are charts showing the flow of the operation in an independent control mode in the SD card; and FIG. 25 is a diagram showing the state transition of a wireless LAN in the SD card.

DETAILED DESCRIPTION

Figure 2:
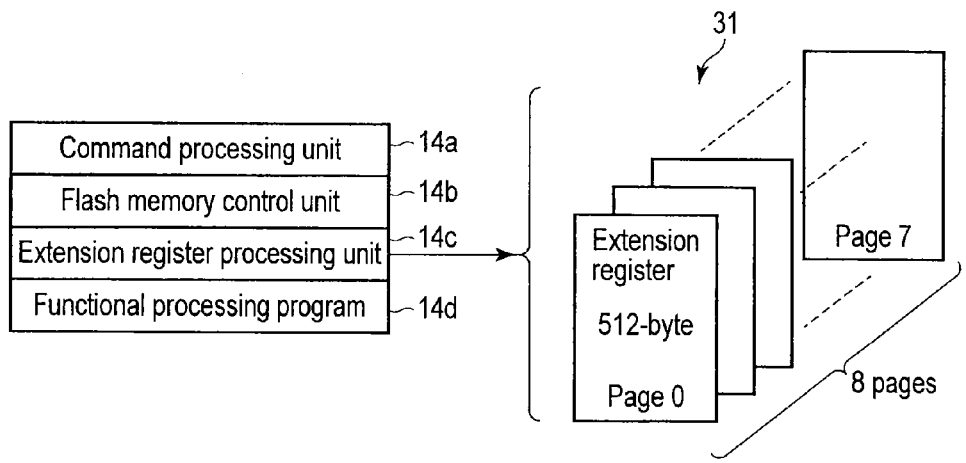
FIG. 2 is a configuration diagram showing an example of firmware of the memory device shown in FIG. 1.

In general, according to one embodiment, a memory device includes a nonvolatile semiconductor memory, a control unit and a wireless communication unit. The control unit controls the nonvolatile semiconductor memory. The wireless communication unit includes a wireless communication function and is controlled by the control unit. The control unit includes a first control mode to control the wireless communication unit in accordance with set information when a control command to control the wireless communication unit is not received within a predetermined time. The control unit includes a second control mode to control the wireless communication unit in accordance with the control command when the control command is received within the predetermined time.

In recent years, wireless data communication has been enabled among various electronic devices (portable digital devices in particular). The electronic devices include personal computers, portable information terminals called, for example, personal digital assistants (PDA), mobile phones, portable audio devices, and digital cameras.

If data can be wirelessly communicated among these electronic devices, cable connection is not needed and convenience can therefore be improved. In particular, along with the spread of wireless local area network (LAN) systems, the wireless LAN systems have become introduced not only in personal computers and built-in device applications but also in SD cards used as memories in, for example, the digital cameras.

In order to enable a wireless LAN function in the SD card, the SD card needs to be mounted with, in addition to a flash memory, components such as an interface for physical connection to a host, an antenna, a high-frequency wave processor (processor to send/receive radio signals), and a baseband processor (processor to process baseband signals).

In such an SD card having the wireless LAN function, the procedure for controlling the wireless LAN function is dependent on the mounting by SD card manufacturers and is therefore not uniquely determined. How to mount a control procedure is another problem.

It is also possible that the SD card having the communication function may have a form of communication function other than the wireless LAN. In this case, the host cannot use the functions of the SD card without any means to know which function the SD card has.

Accordingly, the present embodiment presents means for knowing extended functions other than the original memory function in the SD cards widely used as memories in, for example, digital cameras. The present embodiment also presents a control procedure for the functions other than the original memory function. The present embodiment particularly enables the control of, for example, the wireless LAN in the command system of the SD card. This provides an SD card loaded with a wireless function having a high affinity with a digital device as a host such as a digital camera.

Thus, according to the present embodiment, an extension register comprising a plurality of pages is provided in the SD card, and a command CMD48 or CMD49 which is one of command specifications of the SD card is used to enable reading and writing in the extension register.

The CMD48 is a command to read data from a target register block by block, and the CMD49 is a command to write data into a target register block by block. The extension register has, for example, a page for indicating the functions of the SD card, a page for controlling the communication function of the SD card, and a page used to transfer data to be communicated.

Embodiment

Memory Device Configuration

Hereinafter, a memory system including a memory device according to an embodiment will be described with reference to the drawings.

FIG. 1 is a block diagram showing the configuration of the memory system including the memory device according to the present embodiment.

The memory system comprises a memory device 10 such as an SD card, and a host device (hereinafter also referred to as a host) 20. The memory device 10 operates in response to electric power supply when connected to the host 20, and performs processing corresponding to access from the host 20.

The memory device 10 has a card controller 11, a nonvolatile semiconductor memory such as a NAND flash memory 18, a wireless LAN signal processing unit 19a, a wireless communication signal processing unit 19b, and antennas ATa and ATb. The memory device 10 includes a memory device comprising a nonvolatile semiconductor memory, such as an SD card, a multimedia card, or a USB flash memory.

The card controller 11 comprises, for example, a host interface 12, a CPU 13, a read only memory (ROM) 14, a random access memory (RAM) 15, a buffer 16, a wireless communication interface (I/F) 17a, and a memory interface (I/F) 17b. These components are connected by a bus.

For example, the NAND flash memory 18 is connected to the memory interface 17b. The wireless LAN signal processing unit 19a as an extended functional unit is connected to the wireless communication interface 17a. The antenna ATa for sending/receiving high-frequency signals is connected to the wireless LAN signal processing unit 19a.

The extended functional unit is not limited to the wireless LAN signal processing unit 19a, and the other wireless communication signal processing unit 19b, and the antenna ATb connected to the wireless communication signal processing unit 19b can be added to the extended functional unit. This can configure a multifunction SD card.

The wireless LAN signal processing unit 19a controls, for example, a Wi-Fi (registered trademark) wireless communication function. The wireless communication signal processing unit 19b also controls, for example, a near-field wireless communication function by transferJet (registered trademark).

The host interface 12 performs interface processing between the card controller 11 and the host 20. On the other hand, the wireless communication interface 17a performs interface processing between the wireless LAN signal processing unit 19a and the wireless communication signal processing unit 19b.

The memory interface 17b performs interface processing between the card controller 11 and the NAND flash memory 18.

The CPU 13 is in charge of the operation of the whole memory device 10. As a program to control this CPU 13, firmware (e.g., control program) stored in the ROM 14 or a program loaded onto the RAM 15 is used. That is, the CPU 13 creates various tables and a later-described extension register on the RAM 15. Moreover, the CPU 13 accesses an area on the NAND flash memory 18 in response to a write command, a read command, or an erase command from the host 20. Further, the CPU 13 controls data transfer processing between the CPU 13 and the host 20 via the buffer 16.

Firmware such as the control program used by the CPU 13 is stored in the ROM 14. The RAM 15 is used as a work area of the CPU 13. The control program, various tables, and the later-described extension register are stored in the RAM 15.

When data sent from the host 20 is written into, for example, the NAND flash memory 18, a given volume of data (e.g., one page of data) is temporarily stored in the buffer 16. Moreover, when data read from the NAND flash memory 18 is sent to the host 20, a given volume of data is temporarily stored in the buffer 16. The intervention of the buffer 16 permits asynchronous control of an SD bus interface and a back end.

The NAND flash memory 18 comprises, for example, memory cells having a stacked layer gate structure, or memory cells having a MONOS structure.

The wireless LAN signal processing unit 19a performs wireless LAN signal processing. The wireless LAN signal processing unit 19a is controlled by the card controller 11 via the wireless communication interface 17a. The wireless communication signal processing unit 19b performs wireless communication signal processing. The wireless communication signal processing unit 19b is controlled by the card controller 11 via the wireless communication interface 17a.

For example, a digital camera, a mobile phone, or a personal computer can be applied as the host 20. The host 20 comprises a host controller 21, a CPU 22, a ROM 23, a RAM 24, and a hard disk (HDD) (or, e.g. a solid state drive (SSD)) 25. These components are connected by a bus.

The CPU 22 controls the operation of the whole host. Firmware necessary for the operation of the CPU 22 is stored in the ROM 23. The RAM 24 is used as a work area of the CPU 22. A program executable by the CPU 22 is loaded into the RAM 24, and is executed by the CPU 22. The hard disk 25 holds various kinds of data. The host controller 21 performs processing of interfacing with the memory device 10 when the memory device 10 is connected to the host controller 21. The host controller 21 also issues later-described various commands under the instruction by the CPU 22.

(Firmware Configuration)

Now, the firmware stored in the ROM 14 within the memory device 10 is described.

FIG. 2 shows a functional configuration of the firmware stored in the ROM 14 within the memory device 10.

The functions of the firmware shown are enabled when combined with hardware such as the CPU 13 that constitutes the controller 11. The firmware comprises, for example, a command processing unit 14a, a flash memory control unit 14b, an extension register processing unit 14c, and a functional processing program 14d.

When the memory device 10 is activated, the extension register processing unit 14c generates an extension register 31 in the RAM 15. This extension register 31 is a virtual register, and is capable of defining extended functions.

(Extension Register Configuration)

As shown in FIG. 2, the extension register 31 comprises, for example, 8 pages. One page comprises 512 bytes. An address having at least 9 bits is needed to access a 512-byte extension register on a byte basis, and an address having at least 3 bits is needed to access 8 pages. The whole space of the extension register 31 can be accessed by an address having a total of 12 bits.

The unit of 512 bytes is used because many card controllers and host controllers are configured to perform read/write transfer by one block=512 bytes. A host controller compliant with wireless LAN is capable of one-byte reading/writing, but not all host controllers support one-byte reading/writing. The use of 512-byte accessibility is convenient for the majority of host controllers to enable control of extended functions.

A page 0 of eight pages (pages 0 to 7) is an area for recording an information field to implement plug-and-play of the extended functions. Information regarding the extended functions is recorded in pages 0 to 7. That is, information for controlling the communication function is recorded in, for example, page 1. Information regarding the transfer of data to be communicated is recorded in page 2.

From the information described in page 0 for indicating the functions of the memory device 10, the host 20 can recognize which page to use to control the communication function of the memory device 10 and which page to use to transfer data to be communicated. Details of the information field will be described later.

Exclusive read/write commands defined below are used for reading/writing in the extension register 31. Each of these commands has a first operation mode for reading/writing in the extension register 31, and a second mode to configure a data port.

(Read Command (CMD48) of the Extension Register)

Figure 3:
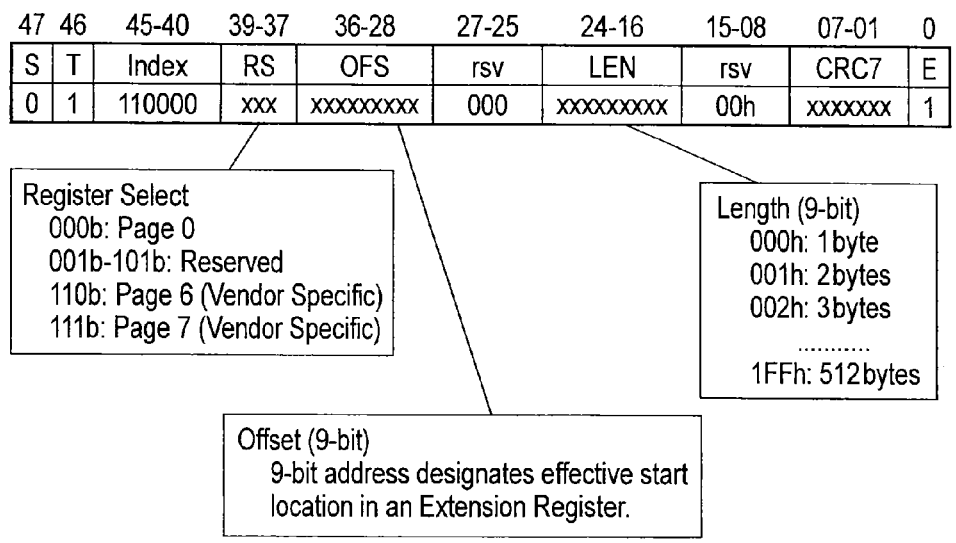
FIG. 3 is a configuration diagram showing an example of a read command of an extension register.

FIG. 3 shows an example of the field configuration of the read command of the extension register 31.

"S" indicates a start bit of the command (CMD48), and "T" is a bit indicating a transfer direction. "Index" indicates a command number. "RS" (register select) indicates a page in the extension register 31, and "OFS" indicates the position (offset from the head of the page) of data in the selected page. A space of 8 pages of the 512-byte extension register can be specified on a byte basis by the 3-bit "RS" and the 9-bit "OFS". More specifically, a selected read start position in the extension register 31 is specified by the "RS" and the "OFS".

"LEN" indicates the data length. The effective data length necessary for reading in the 512-byte extension register is specified by a 9-bit "LEN" field.

"CRC7" indicates a cyclic redundancy check code, and "E" indicates an end bit of the command. "rsv" indicates a preliminary bit.

(Read Command of the Extension Register, First Operation Mode)

Figure 4:
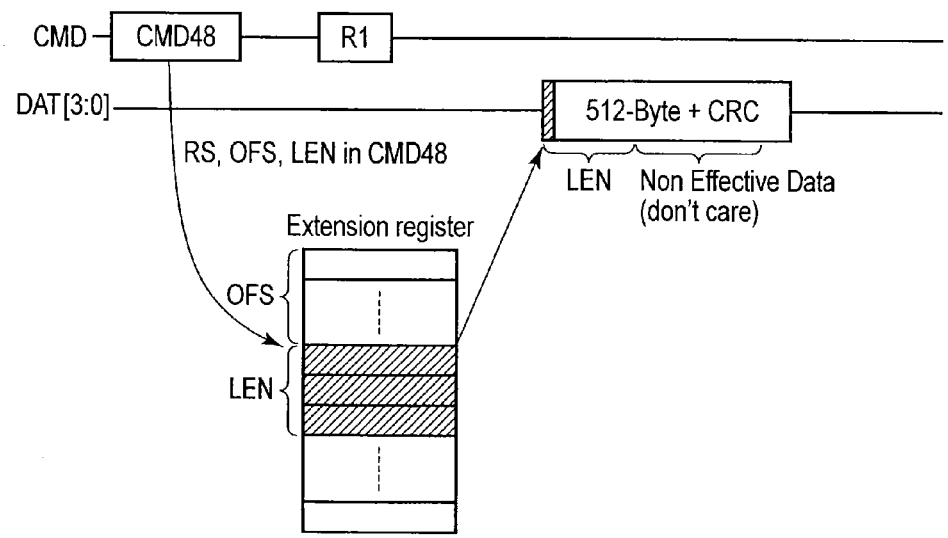
FIG. 4 is a timing chart showing the operation of reading the extension register by the read command.

FIG. 4 shows an example of the operation of reading the extension register by the first operation mode.

As shown in FIG. 4, when the memory device 10 receives the command (CMD48) from the host 20, the memory device 10 sends back a response (R1) to the host 20, and then reads a 512-byte data block from the extension register 31.

More specifically, the argument of the command (CMD48) allows a page of the extension register 31 and a position of data to be read in the page to be specified by the "RS" and the "OFS", and allows the data length to be specified by the "LEN". The data in the extension register 31 specified as described above is set at the head of the 512-byte data block, and read.

Data that surpasses the data length specified by the "LEN" in the 512-byte data block is invalid data. A CRC code is added to the end of the data block, so that whether the data has been correctly received can be checked (checked with the invalid data included). As valid data are arranged starting from the head, the host 20 does not need to perform an operation such as data shift to search for the valid data.

(Read Command of the Extension Register, Second Operation Mode)

Figure 5:
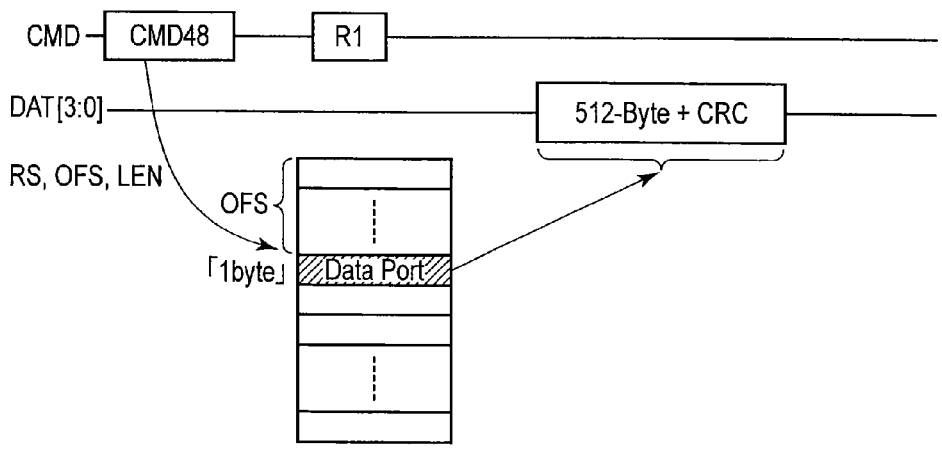
FIG. 5 is a timing chart showing the operation of reading a data port by the read command.

FIG. 5 shows an example of the operation of reading the data port by a second operation mode.

When the memory device 10 receives the command (CMD48) from the host 20, the memory device 10 sends back a response (R1) to the host 20, and then returns the 512-byte data block.

A position in a selected page of the extension register 31 is specified by the arguments "RS" and "OFS" of the command. A plurality of bytes can be allocated to the data port, but one byte is sufficient. Therefore, "LEN=0" in the example of the data port shown in FIG. 5. The data port has only to occupy a one-byte address on an extension register map.

One block (512-byte unit) of data can be read from a device allocated to the data port. That is, one block (512-byte unit) of data can be read at a time. The read data is held in, for example, the buffer 16, and read by the host 20.

If the same data port is then read, the following 512-byte data can be read. Where to take data to be read from the data port can be freely defined in accordance with the specifications of the extended functions. The data port can be controlled by a control register defined on the extension register. It is possible to check whether the CRC code is added to the end of the 512-byte data block and whether the data has been correctly received.

(Write Command (CMD49) of the Extension Register)

Figure 6:
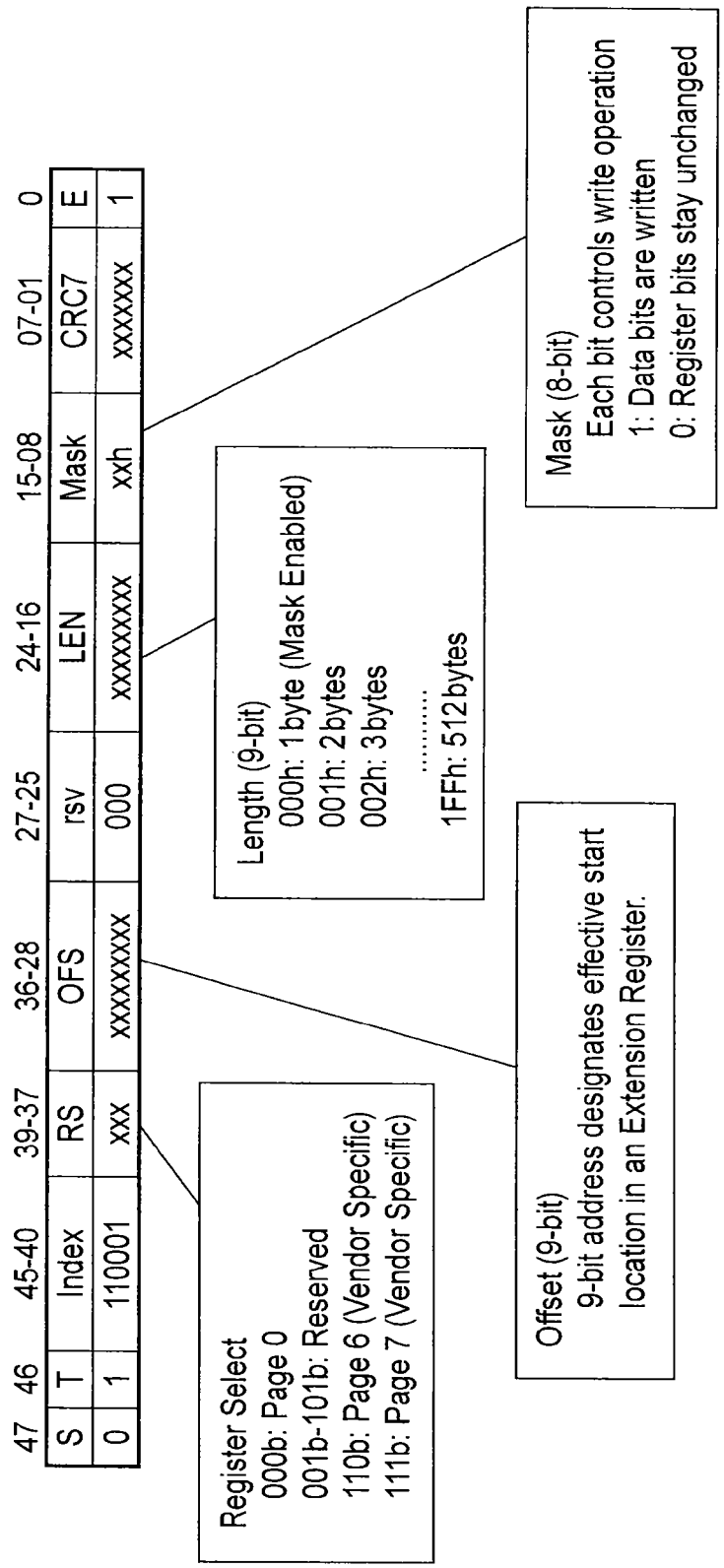
FIG. 6 is a configuration diagram showing an example of a write command of the extension register.

FIG. 6 shows an example of the field configuration of the write command of the extension register 31.

In the write command (CMD49), the same parts as those in the read command (CMD48) are provided with the same signs. The write command and the read command are differentiated from each other by the "index".

A page in the extension register 31 and the position of data in the selected page are specified by the 3-bit "RS" and the 9-bit "OFS". The data length to be written into the 512-byte extension register is specified by the 9-bit "LEN" field. This enables data of any data length (byte unit) in the 512 bytes to be written in any page and place of the extension register 31.

The write command (CMD49) has a mask register provided in its argument. That is, "Mask" indicates a mask register having an 8-bit-length. This mask register enables bit-by-bit operation in the writing of one-byte data, so that data can be written into a specific bit alone. Therefore, read-modify-write is not needed for a bit operation within one byte.

The mask register is effective when the data length is one byte, that is, "LEN=0" (length 1). Data is written into a bit in which data of the mask register "Mask" is "1", and an already set value is saved in a bit in which data of the mask register "Mask" is "0".

(Write Command of the Extension Register, First Operation Mode)

FIG. 7 shows an example of the operation of writing into the extension register by the first operation mode.

When the memory device 10 receives the command (CMD49) from the host 20, the memory device 10 sends back a response (R1) to the host 20, and then receives a 512-byte data block.

The memory device 10 returns to the host 20 the CRC code indicating whether the data block has been correctly received. The memory device 10 returns "busy" before the end of the processing of the command, and the host 20 informs of the timing that permits the issuance of a next command. The received data block is held in the buffer 16.

In the processing of the command (CMD49), a page and a position in the extension register 31 are specified by the arguments "RS" and "OFS" of the command, and data length is specified by the "LEN". Out of the data block held in the buffer 16, data of the length specified by the "LEN" are written into the extension register from the head. Data in the data block that surpass the length specified by the "LEN" are destroyed as invalid data.

The valid data are arranged from the head of the data block so that the host 20 does not need to perform the operation of placing the valid data halfway in the data block.

(Write Command of the Extension Register, Second Operation Mode)

Figure 8:
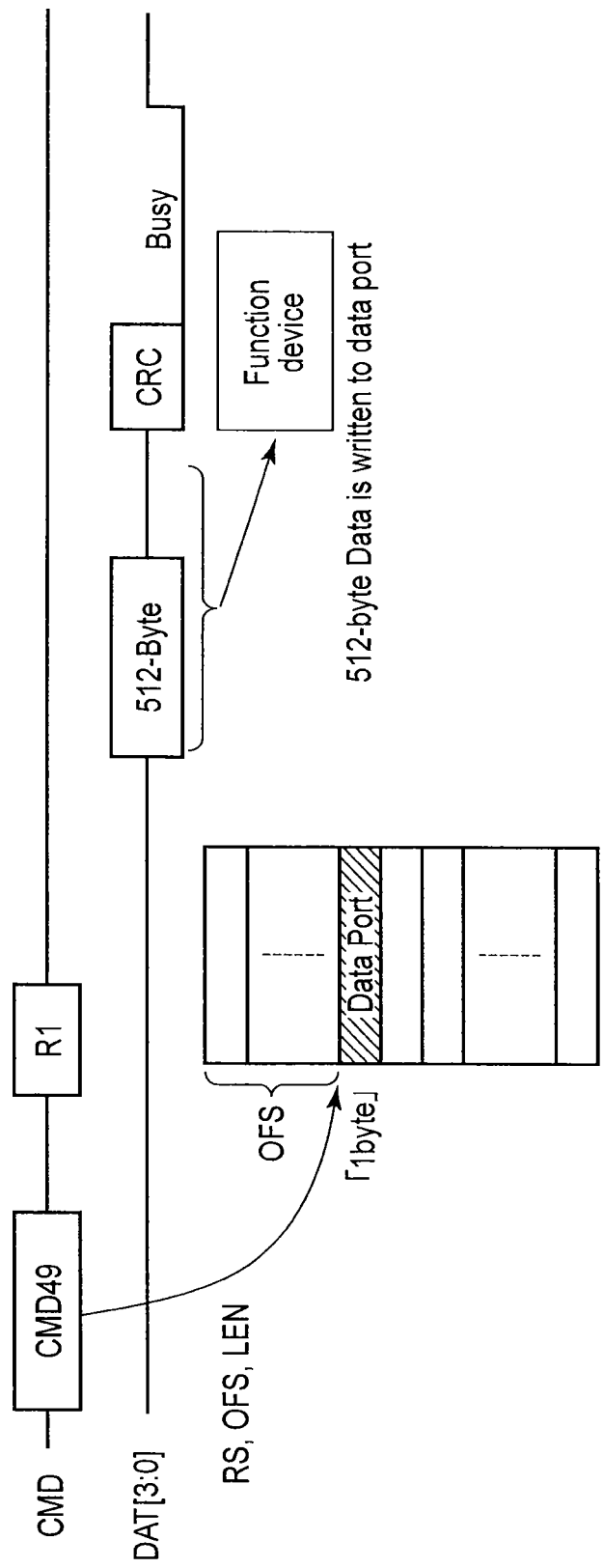
FIG. 8 is a timing chart showing the operation of writing the data port by the write command.

FIG. 8 shows an example of the operation of a write data port by the second operation mode.

When the memory device 10 receives the command (CMD49), the memory device 10 sends back a response (R1), and then returns the 512-byte data block.

The memory device 10 returns the CRC code indicating whether the data block has been correctly received. The memory device 10 returns a "busy" before the end of the processing of the command, and the host 20 informs of the timing that permits the issuance of a next command. The received data block is held in the buffer 16.

In the processing of the command (CMD49), a page and a position in the extension register 31 are specified by the arguments "RS" and "OFS" of the command, and a one-byte (LEN=0) data port is specified by the "LEN". A plurality of bytes can be allocated to the data port, but one byte is sufficient. Therefore, "LEN=0" in the example of the data port shown in FIG. 8. The data port has only to occupy a one-byte address on an extension register map.

One block (512-byte unit) of data held in the buffer 16 can be written into the device allocated to the data port. That is, one block of data can be written at a time.

If data is then written into the same data port, the following 512-byte data can be written into the allocated device. Where to pass the data in the data port can be freely defined in accordance with the specifications of the extended functions. The data port can be controlled by a control register defined on the extension register.

(SD Card Compliant with the Wireless LAN)

Now, an example of the application of the memory device having the wireless communication function according to the embodiment to, for example, a Wi-Fi SD card 10a is described.

Figure 9:
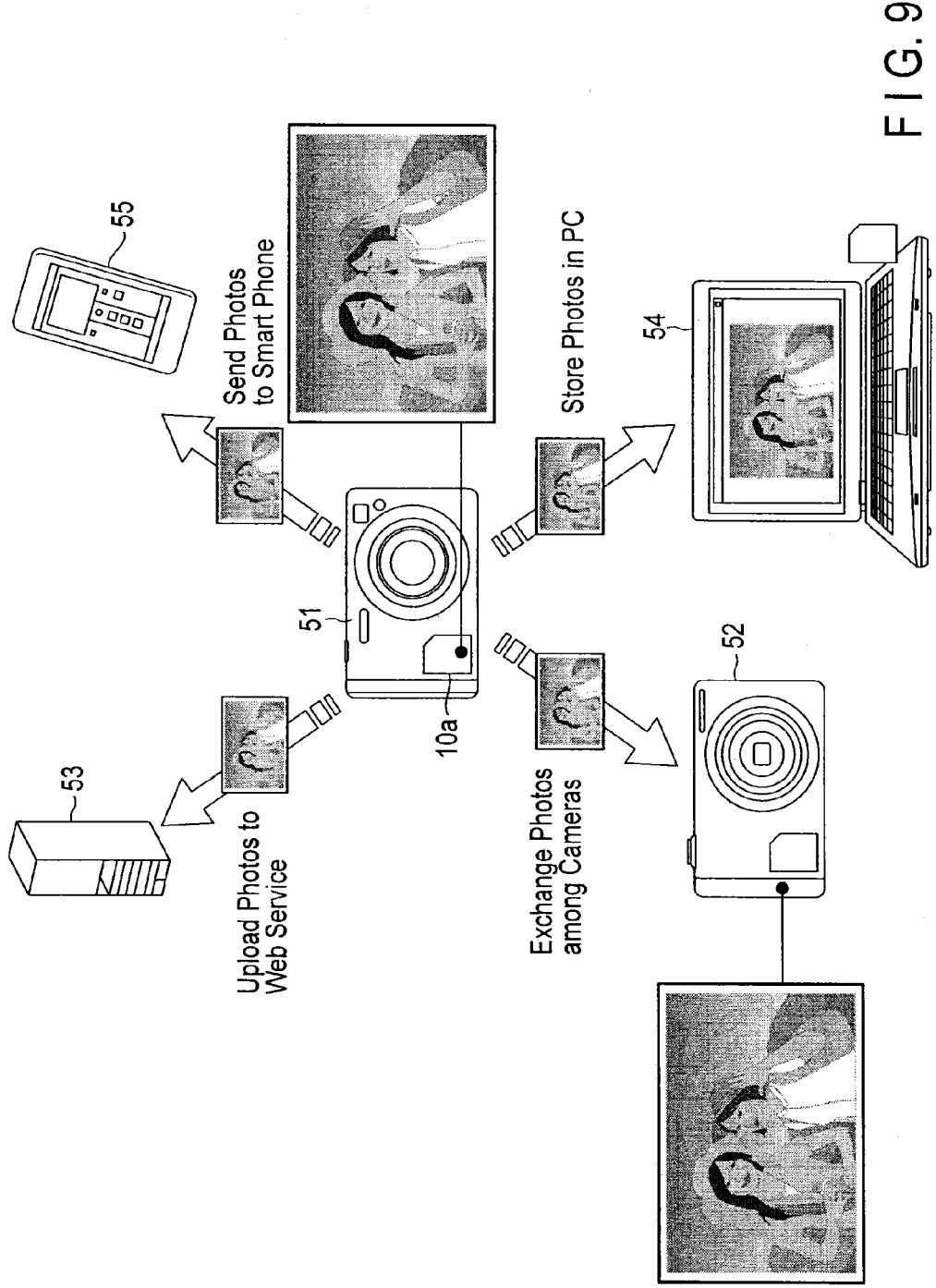
FIG. 9 is a configuration diagram showing an example of application to an SD card having a wireless local area network (LAN)

FIG. 9 shows an example of application to the SD card 10a having the wireless communication function according to the embodiment.

The SD card 10a is attached to, for example, a digital camera 51 or 52, a server 53, a personal computer 54, and a mobile phone 55 as the host device 20.

When used together with the digital camera 51, the SD card 10a having the wireless communication function can send picture data to the other camera 52 on a wireless communication network, or receive picture data from the other camera 52. The SD card 10a can be connected to, for example, the external server 53 via the wireless communication network, and transfer picture data from the digital camera 51 to the server 53. The SD card 10a can also be connected to a device such as the personal computer 54 or the mobile phone 55 via the wireless communication network, and transfer picture data from the digital camera 51 to the personal computer 54 or the mobile phone 55.

FIG. 10 shows an interface function of the SD card 10a.

The SD card 10a having the wireless communication function has the interface function to serve as an interface with, for example, the digital camera 51 which controls the SD card 10a. The SD card 10a also has a network interface function for wireless LAN connection between the digital camera 51 and other electronic devices such as the camera 52, the server 53, the personal computer 54, a television 56, and a printer 57.

The above-mentioned host interface 12 has a function to access (read or write) data in the card via a file allocation table (FAT) 32 in compliance with "SD Specifications Part 1" and "SD Specifications Part 2" standardized by SD Association (SDA). The host interface 12 also has a function to access the extension register (e.g., a Wi-Fi SD register) specific to the card having the wireless communication function.

Here, the read command (CMD48) and the write command (CMD49) are used for access to the Wi-Fi SD register. The read command (CMD48) is a command to read data from a target register block by block, as described above. The write command (CMD49) is a command to write data from a target register block by block.

According to the present embodiment, for example, the host 20 issues a command specific to the Wi-Fi SD card to the SD card 10a. Alternatively, using the write command (CMD49) to write data specific to the Wi-Fi SD card, the host 20 receives a status or response specific to the Wi-Fi SD card from the SD card 10a. Alternatively, the host 20 uses the read command (CMD48) to read data specific to the Wi-Fi SD card.

The wireless communication interface 17a is supposed to support IEEE802.11b/g/n for a physical layer, IPv4 and IPv6 for a network layer, TPC for a transport layer, SSL/TLS for a presentation layer, and HTTP and FTP for an application layer. The wireless communication interface 17a may further have a digital living network alliance (DLNA) function to communicate with home appliances.

The SD card 10a has two interfaces, as shown in FIG. 10, so that picture data (JPEG or RAW format) or moving image data (MPEG-2 TS or MP4 format) created by the digital camera can be sent to or received from the server or device that supports the HTTP protocol. The server or device that supports DLNA permits the reproduction and printing of pictures and moving images. If data (XML data or text data) created by the host 20 is sent in addition to the picture data or the moving image data, the host 20 can perform authentication with the server or peripheral devices or send/receive metadata.

(SD Card Configuration)

FIG. 11 is a functional block diagram showing the configuration of the SD card 10a according to the embodiment.

The Wi-Fi SD card 10a has the host interface 12, a control unit 11a, an independent control unit 11b, the NAND flash memory 18, a wireless LAN functional unit (the wireless LAN signal processing unit 19a, the wireless communication signal processing unit 19b) 19c, and the antennas ATa and ATb. The wireless LAN functional unit 19c includes a function to construct a wireless communication network, a function to connect to the wireless communication network, and a function to disconnect from the wireless communication network.

The host interface 12 processes the command issued from the host controller. The control unit 11a operates in accordance with the processed command. In a general SD card, the control unit 11a can access the NAND flash memory 18 and read and write data.

The control unit 11a of the Wi-Fi SD card 10a according to the present embodiment accesses (reads/writes) the NAND flash memory 18, controls the wireless LAN functional unit 19c, and internally transfers data recorded in the NAND flash memory 18 to the wireless LAN functional unit 19c. Alternatively, the control unit 11a can internally transfer data received by the wireless LAN functional unit 19c to the NAND flash memory 18 (host control mode). Thus, the wireless LAN functional unit 19c can send, for example, the picture data recorded in the NAND flash memory 18 to the outside without the intervention of the host device 20. That is, the host 20 does not need to perform complicated control of the wireless LAN functional unit 19c.

Furthermore, as the picture data is internally transferred without the intervention of the host interface 12, the transfer speed can be increased. For example, if the internal transfer of the picture data is controlled by a direct memory access (DMA) register within the card controller (the control unit 11a), the host 20 and the SD card 10a can independently operate.

Status information regarding the wireless LAN functional unit 19c and data downloaded from a server of an external network can be automatically directly recorded in the NAND flash memory 18 without being sequentially managed by the host 20.

The SD card 10a according to the present embodiment has the independent control unit 11b. The SD card 10a has the independent control unit 11b so that the wireless LAN function can be provided even to a general host device which only has a function of reading/writing in the NAND flash memory 18 and which does not have the function to control the wireless LAN functional unit (independent control mode).

For example, the independent control unit 11b issues, to the control unit 11a, a pseudo command equivalent to the commands (CMD48 and CMD49) issued from the host 20 via the host interface 12. As a result, the control unit 11a can control the wireless LAN functional unit 19c whether the control derives from the host interface 12 or the independent control unit 11b.

(Extension Register of the SD Card)

Now, the extension register of the Wi-Fi SD card 10a is described.

FIG. 12 shows the extension register used in the SD card 10a.

In FIG. 12, "Wi-Fi SD Card Identifier" is information indicating that the extension register is used in the Wi-Fi SD card 10a, and a character string "WIFISD00" is recorded therein.

"Wi-Fi SD Card Specification Version" is the version of the Wi-Fi SD card specification supported by the SD card 10a, and a hexadecimal numeral "0x0100" is recorded therein if, for example, Ver 1.0 is supported.

"Wi-Fi SD Card Profile Indicator" is information indicating the function supported by the SD card 10a. The host device needs to first acquire this information and then only execute the function supported by the SD card 10a.

"Command Write Register Port" is a data port to access a Wi-Fi SD card command write register for issuing a command to the SD card 10a from the host 20.

"Response Data Register Port" is a data port to access a Wi-Fi SD card response data register for acquiring, from the SD card 10a, response data to the command issued by the host 20.

"Status Register" is a Wi-Fi SD card status register for the host 20 to acquire status information regarding the SD card 10a.

"Command Response Status Register" is a Wi-Fi SD card command response status register for the host 20 to acquire status information regarding the command response.

FIG. 13 shows a configuration example of data written into the Wi-Fi SD card command write register via the "Command Write Register Port".

"Wi-Fi SD Card Register Identifier" is information indicating that this data is the data to be written into the Wi-Fi SD card command write register, and a character string "WIFISDCR" is recorded therein.

"Size of Wi-Fi SD Card Register" is information indicating the size of data. The SD card 10a refers to this information to know how many times the command (CMD49) has been issued and which size of data to receive.

"Number of Wi-Fi SD Command Information" is information indicating the number of Wi-Fi SD commands issued by one writing into the Wi-Fi SD card command write register. The host 20 lists a specified number of commands so that the SD card 10a sequentially processes the listed commands. The SD card 10a can also rearrange the commands in the most efficient order in accordance with the kinds of commands, or can process in parallel the commands that can be executed in parallel. For example, processing for an unloaded server can be preferred when data is uploaded to a plurality of servers, or data can be simultaneously transferred to a plurality of servers when the transfer speed of the card is much higher than the network transfer speed of the server of the transfer destination.

"Wi-Fi SD Command Information" comprises "Wi-Fi SD command id", "Wi-Fi SD command sequence id", "Total Number of Arguments", "Length of Argument", and "Argument".

The "Wi-Fi SD command id" indicates the kind of Wi-Fi SD command to be issued. One of Wi-Fi SD commands shown in FIG. 14 is recorded.

The "Wi-Fi SD command sequence id" is a value assigned by the host 20 to identify and differentiate each of the Wi-Fi SD commands to be issued. The host 20 can recognize the status of each of the issued commands by the Wi-Fi SD card command status register.

The "Total Number of Arguments" is the number of arguments of commands to be issued. The "Length of Argument" indicates the size of the data of the argument. The "Argument" indicates the data of the argument.

FIG. 14 shows a list of commands to be written into the Wi-Fi SD card command write register.

A "Scan" command comprises a command having no argument. When the "Scan" command is executed, the host 20 requests the SD card 10a to scan connectable wireless LANs, and a list of service set identifiers (SSID) can be acquired.

A "Connect" command comprises two arguments: "ssid" indicating an SSID name, and "passphrase" indicating a pass phrase. The host 20 sets the SSID name and pass phrase of the wireless LAN to be connected in accordance with SSID information acquired by, for example, the "Scan" command, and can be connected to the wireless LAN as a station (STA) of an infrastructure mode. Here, the station (STA) indicates a mode in which the SD card 10a serves as a wireless LAN terminal to connect to a wireless LAN access point.

An "Establish" command comprises three arguments: "ssid" indicating an SSID name, "passphrase" indicating a pass phrase, and "authentication" indicating an authentication method. The host 20 sets the SSID name, pass phrase, and authentication method of the wireless LAN, and can construct a wireless LAN as an access point (AP) of the infrastructure mode. Here, the access point (AP) indicates a mode in which the SD card 10a serves as a wireless LAN access point for constructing a wireless LAN so that the SD card 10a can be accessed from other wireless LAN terminals.

The authentication method indicates a network authentication method and a data encryption method. One of "Open System and no encryption", "Open System and WEP", "Shared Key and WEP", "WPA and TKIP", "WPA and AES", "WPA-PSK and TKIP", "WPA-PSK and AES", "WPA2 and TKIP", "WPA2 and AES", "WPA2-PSK and TKIP", and "WPA2-PSK and AES" is selected from the host 20.

A "Disconnect" command comprises a command having no argument. The host 20 can end the connection to the wireless LAN connected or constructed by "Connect" or "Establish".

A "ReadResponse" command comprises one argument of "sequence ID" indicating the "Wi-Fi SD Command Sequence id" described in FIG. 13. If the "ReadResponse" command is executed, response data by the command having the specified "Wi-Fi SD Command Sequence id" can be received among the already executed commands. This command permits, for example, a list of SSIDs which is the result of the execution of the "Scan" command to be received.

An "Abort" command comprises one argument of the "sequence ID" indicating the "Wi-Fi SD Command Sequence id" described in FIG. 13. If the "Abort" command is executed, the processing of the command having the specified "Wi-Fi SD Command Sequence id" can be stopped among the already executed commands. For example, this command can be used when the processing needs to be stopped because the user has turned off the power while the user is uploading or downloading a file to or from a device in a network or a Web server.

FIG. 15 shows a configuration example of the Wi-Fi SD card status register.

"Wi-Fi SD Card Register Identifier" indicates that this register is the Wi-Fi SD card status register, and a character string "WIFISDSR" is recorded therein.

"Size of Wi-Fi SD Card Register" indicates the size of this register. If this value is greater than 512 bytes, the host device cannot read all the values of the register by one execution of the command (CMD48), and needs to execute the command (CMD48) register size/512 times (decimals to the next whole number are raised).

"SDIO Status" is information indicating the status of an SDIO function, that is, an input/output function, and indicates whether input/output (SDIO) has been interrupted.

"SDIO Status Mask" is a register for controlling the SDIO function, and can set whether to activate an SDIO interruption function indicated by the "SDIO Status".

"Error Status" is information indicating the error status of the SDIO function.

"WLAN" is information indicating the status of the wireless LAN, and comprises information "Connected" indicating whether connection is performed, information "Scan" indicating whether scanning is performed, and information "AP-STA" indicating the AP or STA of the infrastructure. These pieces of information indicate whether the current status of the wireless LAN is "Initial/Failed", "Scan", "Association", "STA", or "AP" shown in FIG. 25.

"SSID" indicates the SSID name of the currently connected or constructed wireless LAN. When there is no connection to the wireless LAN, the "SSID" indicates an SSID name scheduled to be used during connection or construction.

"Network Authentication" indicates an authentication method of a network which is currently connected to the wireless LAN or constructing the wireless LAN, and a data encryption method. One of "Open System and no encryption", "Open System and WEP", "Shared Key and WEP", "WPA and TKIP", "WPA and AES", "WPA-PSK and TKIP", "WPA-PSK and AES", "WPA2 and TKIP", "WPA2 and AES", "WPA2-PSK and TKIP", and "WPA2-PSK and AES" is selected.

"HTTP Processing" indicates whether the SD card 10a has sent/received an HTTP message.

"HTTP Progress" indicates the percentage of completion of the sending/receiving of the HTTP message. The SD card 10a can know the total size of the HTTP message being sent/received from its header, and calculates the percentage of completion from the size of the HTTP message which has been sent/received.

"Date" indicates the current date.

"Time" indicates the current time.

"Media Change" is information indicating whether the file allocation table (FAT) information of a NAND memory module in the card is updated. When the file allocation table is updated, the host 20 needs to re-cache the FAT information of the SD card 10a if the host 20 has FAT information cached therein. This information is automatically initialized after being acquired by the host 20. Alternatively, this information is readable/writable information, and can be initialized.

"Response Data Update" is information indicating whether "Response Data" has been updated. This information indicates whether the SD card 10a has received response data such as an SSID list as a result of the execution of a command such as the "Scan" by the host 20. By referring to this information, the host 20 can know whether the SD card 10a has received the response data and the response data can be referred to by the Wi-Fi SD card response data register. This information is initialized when the host 20 has completed the reading of all "Response Data" in response to the command (CMD48). Alternatively, this information is readable/writable information, and can be initialized.

"Response Data Size" is information indicating the size of the received response data on a byte basis.

"Signal Strength" is information indicating the current signal strength. "No signal", "level 1", "level 2", "level 3", "level 4", or "level 5" is set.

"MAC Address" is information indicating the MAC address of the SD card 10a.

"IDs" is information indicating the identification data (ID) of the SD card 10a. In this value, a value set in the ID information within "Configuration information" shown in FIG. 19 which can be set by the user is reflected.

FIG. 16 shows a configuration example of the Wi-Fi SD card command response status register.

"Wi-Fi SD Card Register Identifier" is information indicating that this register is the Wi-Fi SD card command response status register, and a character string "WIFISDRS" is recorded therein.

"Size of Wi-Fi SD Card Register" is information indicating the size of the register. The host device refers to this information to know how many times the command (CMD48) has been issued and which size of data to read.

"Number of Wi-Fi SD Command Response Status" is information indicating the number of "Wi-Fi SD Command Response Statuses" that can be acquired by one reading of the Wi-Fi SD card command response status register.

Each "Wi-Fi SD Command Response Status" comprises "Wi-Fi SD command id", "Wi-Fi SD command sequence id", "Command Response Status", and "Reserved for Vendors for Error Status".

The "Wi-Fi SD command id" indicates the kind of Wi-Fi SD command issued by the host 20 via a Wi-Fi SD card command register. One of the Wi-Fi SD commands shown in FIG. 14 is recorded.

The "Wi-Fi SD command sequence id" is a value assigned by the host 20 to identify each command when the host 20 issues the command, and the same value as this command is set.

The "Command Response Status" is information indicating the status of the command issued by the host 20, and indicates whether the SD card 10a has received the issued command without any problem or has not received the issued command due to some problem. For example, the command cannot be received when there is a problem in the setting of the issued command or when a new command cannot be accepted because the card is performing other command processing.

The "Reserved for Vendors for Error Status" is information indicating the reason of the occurrence of an error if any.

FIG. 17 shows a configuration example of data read from the Wi-Fi SD card response data register via the "Response Data Register Port".

"Wi-Fi SD Card Identifier" is information indicating that this data is the data received from the Wi-Fi SD card response data register, and a character string "WIFISDRD" is recorded therein.

"Size of Wi-Fi SD Card Register" is information indicating the size of data. The host 20 refers to this information to know how many times the command (CMD48) should be issued and which size of data to read.

"Number of Wi-Fi SD Response Data" is information indicating the number of "Response Data" that can be acquired by one reading of the Wi-Fi SD card response data register.

"Wi-Fi SD command id" indicates the kind of Wi-Fi SD command issued by the host 20 via the Wi-Fi SD card command register. One of the Wi-Fi SD commands shown in FIG. 14 is recorded.

"Wi-Fi SD command sequence id" is a value assigned by the host 20 to identify each command when the host 20 issues the command, and the same value as this command is set.

"Size of Response Data" is information indicating the size of "Response Data". When a command such as a "Send Message By Register" is issued to send an HTTP request message via the Wi-Fi SD card command write register and receive an HTTP response message via the Wi-Fi SD card response data register, the received data is recorded in the "Response Data".

(Directory Configuration of SD Card)

Figure 18:
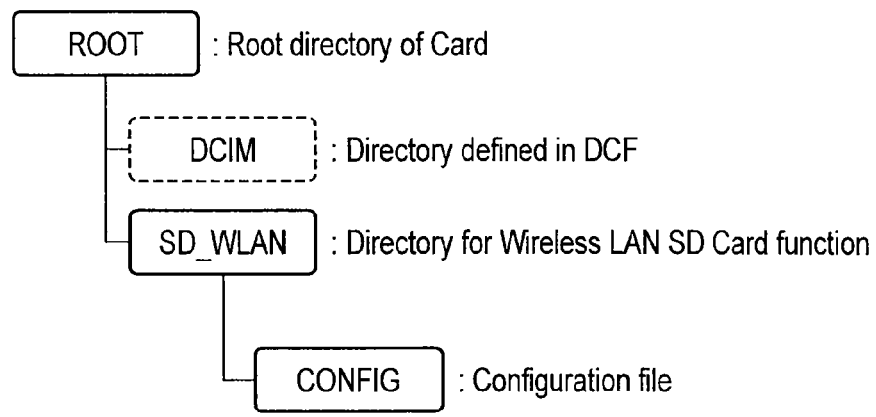
FIG. 18 is a diagram showing a directory configuration in the SD card.

FIG. 18 shows a directory configuration of the NAND flash memory 18 in the SD card 10a.

A "DCIM" directory is a directory to record picture data determined by a design rule for the camera file system (DCF) standard. An "SD_WLAN" directory is a directory to record data associated with the Wi-Fi SD card according to the present embodiment.

A "CONFIG" file is recorded under the "SD_WLAN" directory. The "CONFIG" file is a file to record the "Configuration information" shown in FIG. 19, and the host 20 can edit the "CONFIG" file.

When the host 20 executes the "Connect" command or the "Establish" command to connect or construct the wireless LAN or when the SD card 10a automatically connects or constructs the wireless LAN in the independent control mode, set information in the "Configuration information" is used for the connection and setting.

FIG. 19 shows a configuration example of the "Configuration information" recorded in the SD card 10a.

The "Configuration information" is classified into setting information ([WLANSD]) used in the host control mode and setting information ([Vendor]) used in the independent control mode.

"ID" in the "WLANSD" is information for setting an ID of the SD card 10a, and is used, for example, as an ID for a sender to identify a receiver in the connection between cards.

"DHCP_Enabled" is information for setting whether to use DHCP for the setting of, for example, an IP address.

"IP_Address" is information used to manually set an IP address.

"Subnet_Mask" is information used to manually set a "Subnet Mask".

"Default_Gateway" is information used to manually set a "Default Gateway".

"Preferred_DNS_Server" is information used to manually set a preferred DNS server.

"Alternate_DNS_Server" is information used to manually set an alternate DNS server.

"Proxy_Server_Enabled" is information indicating whether to use a proxy server.

"Proxy_Server_Name" is a proxy server name to be set.

"Port Number" is a port number of the proxy server to be set.

An "APPMODE" in the "Vendor" is configured to set startup conditions of the wireless LAN and the operation after startup in the independent control mode. The following seven settings are possible.

APPMODE=0: WriteProtect setting in JPEG data indicating a preset "wireless startup screen" is changed to start the AP of the infrastructure mode.

APPMODE=1: The WriteProtect setting in the JPEG data indicating the preset "wireless startup screen" is changed to start the STA of the infrastructure mode.

APPMODE=2: The AP of the infrastructure mode is started at startup.

APPMODE=3: The STA of the infrastructure mode is started at startup.

APPMODE=4: The AP of the infrastructure mode is started by a predetermined sequential file writing operation.

APPMODE=5: The STA of the infrastructure mode is started by a predetermined sequential file writing operation.

APPMODE=6: The STA of the infrastructure mode is started at startup, and when connection is impossible, restart is performed after a switch to the AP of the infrastructure mode (AP/STA automatic switch).

"APPNAME" sets names NETBIOS and Bonjour.

"APPSSID_AP" sets an SSID for the SD card 10a to construct a wireless LAN by the AP of the infrastructure mode in the APPMODE=0, 2, 4, 6 of the independent control mode.

"APPNETWORKKEY_AP" sets a pass code for the SD card 10a to construct a wireless LAN by the AP of the infrastructure mode in the APPMODE=0, 2, 4, 6 of a non control mode. When the set pass code is effective, there is no problem if this value is read by a third party after the setting because the pass code is encrypted and then recorded so that the SD card 10a alone can decrypt the pass code.

"APPAUTHENTICATION" sets an authentication method for the SD card 10a to construct a wireless LAN by the AP of the infrastructure mode in the APPMODE=0, 2, 4, 6 of the independent control mode. The authentication method indicates a network authentication method and a data encryption method. One of "Open System and no encryption", "Open System and WEP", "Shared Key and WEP", "WPA and TKIP", "WPA and AES", "WPA-PSK and TKIP", "WPA-PSK and AES", "WPA2 and TKIP", "WPA2 and AES", "WPA2-PSK and TKIP", and "WPA2-PSK and AES" is set.

"APPSSID_STA" sets an SSID for the SD card 10a to construct a wireless LAN by the STA of the infrastructure mode in the APPMODE=1, 3, 5, 6 of the independent control mode.

"APPNETWORKKEY_STA" sets a pass code for the SD card 10a to construct a wireless LAN by the STA of the infrastructure mode in the APPMODE=1, 3, 5, 6 of the infrastructure mode. When the set pass code is effective, there is no problem if this value is read by a third party after the setting because the pass code is encrypted and then recorded so that the SD card 10a alone can decrypt the pass code.

"APPMINTIME" and "APPMXTIME" are parameters of a sequential photography operation in the APPMODE=4, 5 of the independent control mode. The unit of the parameters is a 1 msec interval. When a file is written in the set "APPMINTIME" or more and the set "APPMXTIME" or less, the wireless LAN is started by the AP of the infrastructure mode if APPMODE=4, and the wireless LAN is started by the STA of the infrastructure mode if APPMODE=5.

"APPAUTOTIME" is a parameter of an automatic connection operation mode in the APPMODE=0, 1, 2, 3, 4, 5, 6 of the independent control mode. The unit of the parameter is a 1 msec interval. When the wireless LAN is started by the AP of the infrastructure mode, the SD card 10a automatically ends the wireless LAN if there are no connections from other STA devices during the time specified by this parameter. This can suppress electric power consumption. When the wireless LAN is started by the STA of the infrastructure mode, the SD card 10a also automatically ends the wireless LAN if connection to a specified AP device is impossible during the time specified by this parameter. This can suppress electric power consumption.

"APPHOSTTIME" is a parameter for setting a time from startup to the start of the independent control mode. The unit of the parameter is a 1 msec interval. During this time, the SD card 10a waits for a command to control the wireless LAN from the host.

(Operation Flow of the SD Card)

Figure 20:
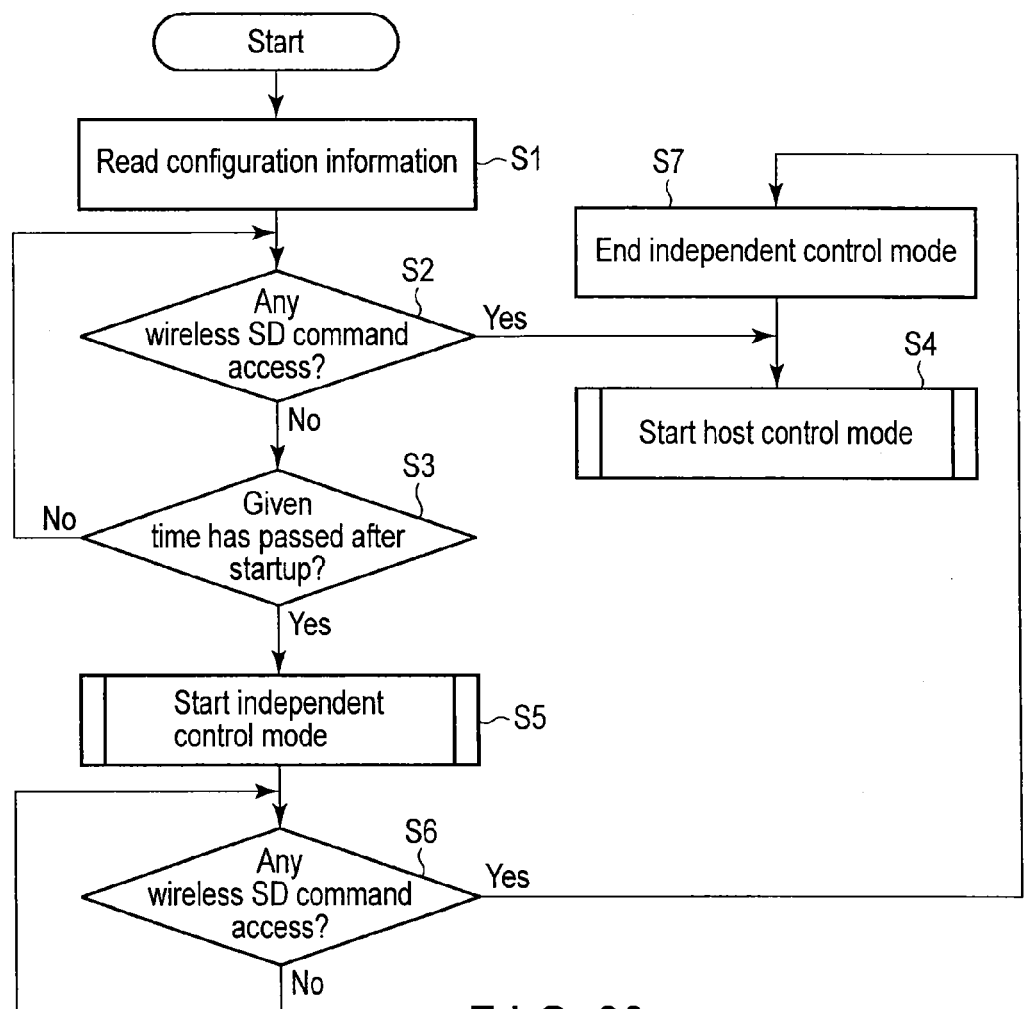
FIG. 20 is a chart showing the flow of the operation of the SD card.

FIG. 20 shows the operation flow of the SD card 10a according to the present embodiment. This flow determines whether to operate the SD card 10a in the "host control mode" in which the wireless LAN is controlled from the host 20 or the "independent control mode" in which the SD card 10a independently controls the wireless LAN without control from the host 20.

When the SD card 10a is activated, the control unit 11a reads the "Configuration information" in the NAND flash memory 18, and sets the information shown in FIG. 19 (step S1).

The control unit 11a then waits for the issuance of an SD command for controlling the wireless LAN from the host 20 for a specified time set in the "APPHOSTTIME" (steps S2 and S3). If the SD command for controlling the wireless LAN is issued within the specified time, the control unit 11a recognizes that the host 20 is a host capable of controlling the wireless LAN, and the control unit 11a starts the host control mode (step S4).

If the SD command for controlling the wireless LAN is not issued from the host 20 within the specified time, the control unit 11a recognizes that the host 20 is a normal host incapable of controlling the wireless LAN (only capable of reading from or writing into the NAND flash memory), and the control unit 11a starts the independent control mode (step S5).

However, even during the execution of the independent control mode, if the SD command for controlling the wireless LAN is issued from the host 20, the control unit 11a recognizes that the host 20 is a host capable of controlling the wireless LAN, and the control unit 11a ends the independent control mode to switch to the host control mode (steps S6, S7, and S4).

Here, the SD command for controlling the wireless LAN includes, for example, the command (CMD48) or the command (CMD49). More specifically, this means that the command (CMD49) is used to issue data to be written into the Wi-Fi SD card command write register via the "Command Write Register Port" shown in FIG. 13. The wireless LAN functional unit 19c is controlled by this command (CMD49).

Figure 21:
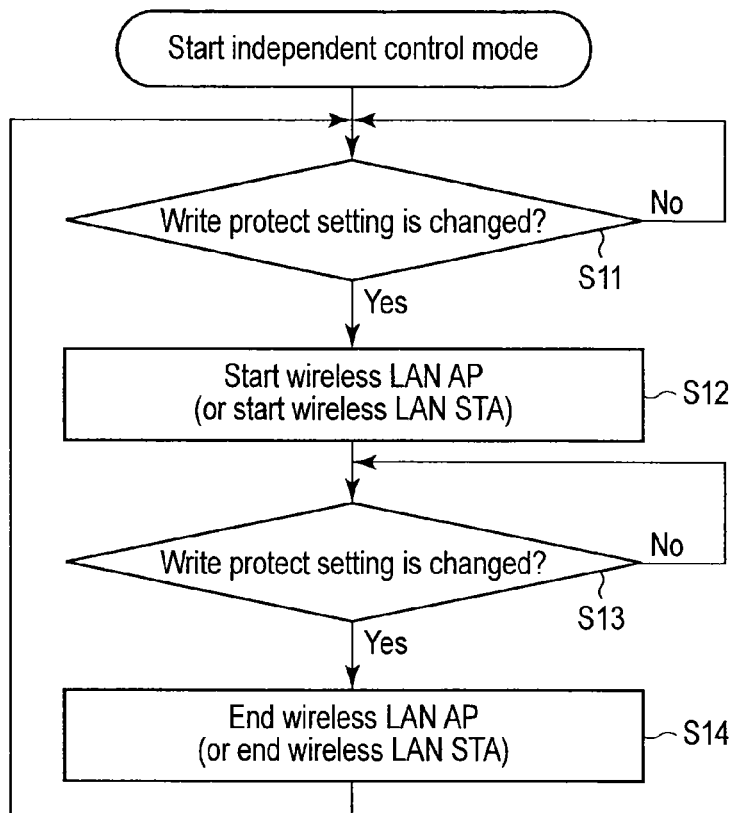

FIG. 21 shows the operation flow of the SD card 10a in the independent control mode when the APPMODE=0, 1.

When the independent control mode is started, the independent control unit 11b checks the attributes of a predetermined file. For example, when the attribute of the predetermined file has changed from "readable/writable" to "read-only" (write protect state) and vice versa (step S11), the AP of the infrastructure mode is started in accordance with the "APPSSID_AP", the "APPNETWORKKEY_AP", and the "APPAUTHENTICATION" if the APPMODE=0. If the APPMODE=1, the STA of the infrastructure mode is started in accordance with the "APPSSID_STA" and the "APPNETWORKKEY_STA" (step S12).

The independent control unit 11b then further checks the attributes of the predetermined file. When the attributes of the predetermined file have changed from the previous state (step S13), the activated AP of the infrastructure mode is ended if the APPMODE=0. If the APPMODE=1, the activated STA of the infrastructure mode is ended (step S14). The flow then returns to step S11. The above-described routine can be repeated.

Owing to the above-described operation, even the normal host having no function to control the wireless LAN can control the startup and end of the wireless LAN in the SD card 10a if the host is mounted with a function to change the attributes of the file.

The startup and end of the wireless LAN in this card can also be controlled if the independent control unit sequentially checks the changes of a particular file not only by changing the attributes of the file, for example, changing the attributes of the file from "readable/writable" to "read-only" but by setting the date information of the file to a particular value or setting digital print order format (DPOF) information that indicates the printing of the file.

Figure 22:
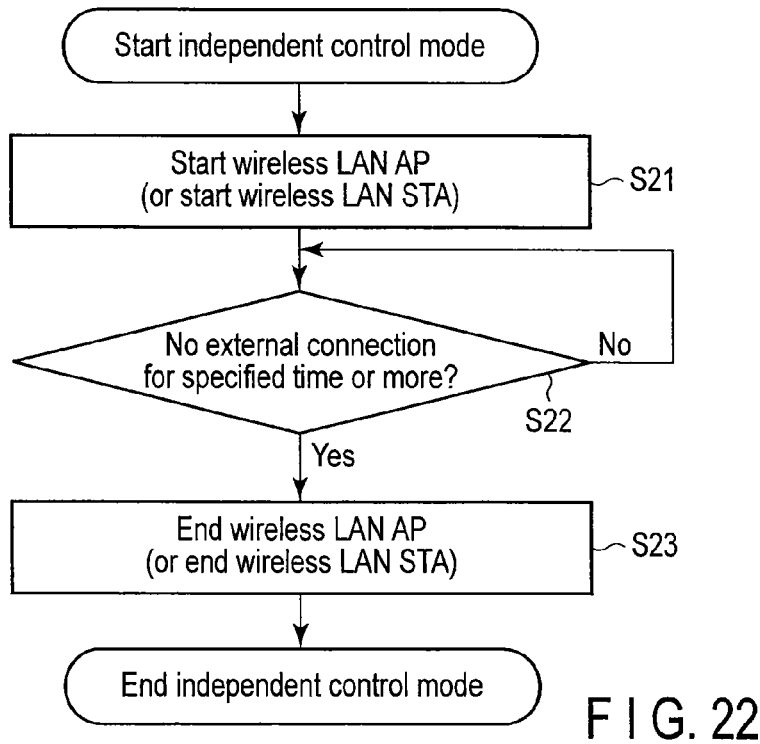

FIG. 22 shows the operation flow of the SD card 10a in the independent control mode when the APPMODE=2, 3.

When the independent control mode is started, the independent control unit 11b immediately starts the AP of the infrastructure mode in accordance with the "APPSSID_AP", the "APPNETWORKKEY_AP", and the "APPAUTHENTICATION" if the APPMODE=2. If the APPMODE=3, the independent control unit 11b immediately starts the STA of the infrastructure mode in accordance with the "APPSSID_STA" and the "APPNETWORKKEY_STA" (step S21).

However, the AP is ended if there are no connections from other external STA devices during the time specified by the "APPAUTOTIME" while the AP is in operation when the APPMODE=2. Alternatively, the STA is ended if connection to a target AP device is impossible during the time specified by the "APPAUTOTIME" while the STA is in operation when the APPMODE=3 (steps S22 and S23). The independent control mode is then ended.

Owing to the above-described operation, even the normal host having no function to control the wireless LAN can control the startup and end of the wireless LAN in this card.

FIG. 23 shows the operation flow of the SD card 10a in the independent control mode when the APPMODE=4, 5.

When the independent control mode is started, the independent control unit 11b checks file writing. When files are sequentially written and when the difference in time between the sequential writings is the "APPMINTIME" or more and the "APPMXTIME" or less, that is, within a specified time (step S31), the AP of the infrastructure mode is started in accordance with the "APPSSID_AP", the "APPNET- WORKKEY_AP", and the "APPAUTHENTICATION" if the APPMODE=4. If the APPMODE=5, the STA of the infrastructure mode is started in accordance with the "APPSSID_STA" and the "APPNETWORKKEY_STA" (step S32).

The independent control unit 11b then further checks file writing. When the difference in time between the sequential writings is the "APPMINTIME" or more and the "APPMXTIME" or less (step S33), the AP of the infrastructure mode is ended if the APPMODE=4. If the APPMODE=5, the STA of the infrastructure mode is ended (step S34). The flow then returns to step S31. The above-described routine can be repeated.

Owing to the above-described operation, even the normal host having no function to control the wireless LAN can control the startup and end of the wireless LAN in this card.

FIG. 24 shows the operation flow of the SD card 10a in the independent control mode when the APPMODE=6.

When the independent control mode is started, the independent control unit 11b starts the STA of the infrastructure mode, and starts a scan operation to find a wireless LAN access point (step S41).

If the wireless LAN access point specified by the "APPSSID_STA" is found, a network key specified by the "APPNETWORKKEY_STA" is used to connect to the access point (step S44).

If the specified access point is not found or if it is not possible to connect to the access point (e.g., the network key does not fit), the AP of the infrastructure mode is started in accordance with the "APPSSID_AP", the "APPNETWORKKEY_AP", and the "APPAUTHENTICATION" (step S43).

When the STA of the infrastructure mode is started (step S44), a scan is again performed after the connection to the access point has ended (steps S45 and S41). The STA of the infrastructure mode is then restarted (step S44), or the start of the AP of the infrastructure mode is attempted (step S43).

When the AP of the infrastructure mode is started, the AP in operation is ended if there are no connections from other external STA devices during the time specified by the "APPAUTOTIME" while the AP is in operation (step S47). The flow then returns to step S41. The above-described routine can be repeated.

Owing to the above-described operation, even the normal host having no function to control the wireless LAN can be connected to the network via the Wi-Fi access point, for example, in the house, or can control the wireless LAN to construct its own network outside the house.

(State Transition of the SD Card)

FIG. 25 is a state transition diagram of the wireless LAN in the SD card 10a.

The state of the wireless LAN in the SD card 10a is classified into "Initial/Failed", "Scan", "AP", "STA", and "Association".

The "Initial/Failed" indicates the initial state of the wireless LAN in the host control mode and the independent control mode. However, the wireless LAN also shifts to the same state as the initial state in the event of an error in some processing.

The "Scan" is a state indicating that scanning is being performed in response to the "Scan" command. If the scanning has ended and an SSID list is acquired, the wireless LAN returns to the initial state "Initial/Failed".

The "AP" is a state where a wireless LAN is constructed as an access point. In the host control mode, the wireless LAN shifts from the initial state "Initial/Failed" when the "Establish" command to serve as the AP of the infrastructure mode is executed. In the independent control mode, the wireless LAN shifts from the "Initial/Failed" when the AP of the infrastructure mode is automatically started.

In the "AP" state, the wireless LAN shifts to the initial state "Initial/Failed" when the "Disconnect" command is issued in the host control mode, or when the AP of the infrastructure mode is automatically ended in the independent control mode.

The "Association" is a state where wireless LAN connection processing called association is performed to connect to the wireless LAN as the STA of the infrastructure mode, and, for example, an IP address is being set from a dynamic host configuration protocol (DHCP) server. In the host control mode, the wireless LAN shifts from the initial state "Initial/Failed" when the "Connect" command to serve as the STA of the infrastructure mode is executed. In the independent control mode, the wireless LAN shifts from the "Initial/Failed" when the STA of the infrastructure mode is automatically started. If the association and the acquisition of the IP address are successful, the SD card 10a is connected to the wireless LAN as the STA and shifts to the state "STA" in which an IP address is allocated. If the association and the acquisition of the IP address are unsuccessful, the wireless LAN returns to the initial state "Initial/Failed".

In the "STA" state, the wireless LAN shifts to the initial state "Initial/Failed" when the "Disconnect" command is issued in the host control mode, or when the STA of the infrastructure mode is automatically ended in the independent control mode. When the "STA" is disconnected during connection to the wireless LAN, the "STA" state shifts to the "Association" state, and the association is again attempted.

The current state of the wireless LAN is reflected in WLAN information in the Wi-Fi SD card status register shown in FIG. 15, so that in the host control mode, the host 20 can recognize the state of the wireless LAN at any time by issuing the command (CMD48). Thus, the host 20 can execute the command suited to the current state of the wireless LAN.

According to the embodiment described above, the following advantageous effects can be obtained.

Most SD cards having the wireless LAN function operate without control from the host device. However, the operation of the card is limited without the control by the host device. The SD card having the wireless LAN function according to the present embodiment operates in response to the control command of the host device compliant with this card, and is thereby capable of more complicated control of the wireless LAN.

On the other hand, the SD card having the wireless LAN function according to the present embodiment is characterized by also having a wireless LAN control function for host devices that have no function to control the wireless LAN. That is, the SD card having the wireless LAN function according to the present embodiment can dynamically control the wireless LAN function in accordance with the functions of the host device. In other words, it is possible to provide an SD card having the wireless LAN function which differentiates a host device having the wireless LAN control function from a host device having no control function and which enables wireless LAN control suited to the functions of the host devices.

As described above, according to the embodiment, it is possible to provide a memory device and a wireless communication control method of the same that enable the control of a wireless communication function even in a normal host device having no wireless LAN control function. For example, it is possible to provide a memory device which can control the startup and end of its wireless LAN even for a host device having no wireless LAN control function.

According to the embodiment, it is possible to provide a memory device and a wireless communication control method of the same that enable the control of a wireless communication regardless of the control from a host device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device comprising:
   a nonvolatile semiconductor memory;
   a control unit which controls the nonvolatile semiconductor memory; and
   a wireless communication unit which includes a wireless communication function and which is controlled by the control unit,
   wherein the control unit includes a first control mode to control the wireless communication unit independently by the control unit without being based on a control command, by issuing a first command equivalent to the control command, when the control command to control the wireless communication unit is not received within a predetermined time, and
   the control unit includes a second control mode to control the wireless communication unit in accordance with the control command when the control command is received within the predetermined time.

2. The memory device according to claim 1, wherein
   in the first control mode, the control unit performs one of start and end of the wireless communication function in the wireless communication unit in accordance with whether a predetermined file stored in the nonvolatile semiconductor memory has been modified.

3. The memory device according to claim 1, wherein
   in the first control mode, the control unit ends an operation of the wireless communication function when no connection is established between the outside and the wireless communication unit for a predetermined time or more during the operation of the wireless communication function in the wireless communication unit.

4. The memory device according to claim 1, wherein
   in the first control mode, the control unit starts the wireless communication function in the wireless communication unit in response to sequential writing performed within a predetermined time, and
   the control unit ends an operation of the wireless communication function in response to sequential writing performed within a predetermined time during the operation of the wireless communication function.

5. The memory device according to claim 1, wherein
   in the first control mode, the control unit starts as a station when a registered access point of a wireless communication network is found, and
   the control unit starts as an access point of the wireless communication network when the registered access point is not found.

6. The memory device according to claim 1, wherein
   in the first control mode, the control unit shifts to the second control mode from the first control mode when receiving the control command to control the wireless communication unit.

7. The memory device according to claim 1, wherein
   the nonvolatile semiconductor memory stores set information, and in the first control mode, the control unit controls the wireless communication unit in accordance with the set information.

8. The memory device according to claim 1, wherein
   the wireless communication function of the wireless communication unit includes a function to construct a wireless communication network, a function to connect to the wireless communication network, and a function to disconnect from the wireless communication network.

9. The memory device according to claim 2, wherein
   the modification to the predetermined file includes setting of the predetermined file to a write protect state.

10. The memory device according to claim 2, wherein
    the modification to the predetermined file includes setting of print information for the predetermined file.

11. A wireless communication control method of a memory device including a wireless communication function, the method comprising:
    performing a first control mode to control the wireless communication function independently by the memory device without being based on a control command, by issuing a first command equivalent to the control command, when the control command to control the wireless communication function is not received within a predetermined time; and
    performing a second control mode to control the wireless communication function in accordance with the control command, by the memory device, when the control command is received within the predetermined time.

12. The method according to claim 11, wherein
    in the first control mode, the wireless communication function is any one of started and ended in accordance with whether a predetermined file stored in the memory device has been modified, by the memory device.

13. The method according to claim 11, wherein
    in the first control mode, an operation of the wireless communication function is ended, by the memory device, when no connection to the outside is established for a predetermined time or more during the operation of the wireless communication function.

14. The method according to claim 11, wherein
    in the first control mode, the wireless communication function is started in response to sequential writing performed within a predetermined time, by the memory device, and
    an operation of the wireless communication function is ended in response to sequential writing performed within a predetermined time during the operation of the wireless communication function, by the memory device.

15. The method according to claim 11, wherein
    in the first control mode, the memory device starts as a station when a registered access point of a wireless communication network is found, and
    the memory device starts as an access point of the wireless communication network when the registered access point is not found.

16. The method according to claim 11, wherein
    in the first control mode, a shift is made to the second control mode from the first control mode, by the memory device, when the control command to control the wireless communication function is received.

17. The method according to claim 11, wherein
the memory device stores set information, and in the first control mode, the memory device controls the wireless communication function in accordance with the set information.

18. The method according to claim 11, wherein
the wireless communication function includes a function to construct a wireless communication network, a function to connect to the wireless communication network, and a function to disconnect from the wireless communication network.

19. The method according to claim 12, wherein
the modification to the predetermined file includes setting of the predetermined file to a write protect state.

20. The method according to claim 12, wherein
the modification to the predetermined file includes setting of print information for the predetermined file.

* * * * *